United States Patent [19]
Scherer

[11] Patent Number: 6,137,870
[45] Date of Patent: *Oct. 24, 2000

[54] SYSTEM FOR PROVIDING CALLER INFORMATION TO CALLED PARTY VIA CALL STANDARD DATA FIELD

[75] Inventor: Gordon F. Scherer, Westerville, Ohio

[73] Assignee: Convergys Customer Management Group, Inc., Cincinnati, Ohio

[*] Notice: This patent issued on a continued prosecution application filed under 37 CFR 1.53(d), and is subject to the twenty year patent term provisions of 35 U.S.C. 154(a)(2).

[21] Appl. No.: 08/612,452

[22] Filed: Mar. 6, 1996

[51] Int. Cl.[7] .................................................. H04M 15/06
[52] U.S. Cl. ............................................ 379/127; 379/142
[58] Field of Search ................................... 379/142, 188, 379/189, 199, 201, 210, 211, 212, 127, 245, 246, 265, 266, 258, 144, 114, 113

[56] References Cited

U.S. PATENT DOCUMENTS

| | | |
|---|---|---|
| 4,696,028 | 9/1987 | Morganstein et al. ..................... 379/88 |
| 4,759,056 | 7/1988 | Akiyama ................................. 379/197 |
| 4,809,321 | 2/1989 | Morganstein et al. ................... 379/211 |
| 4,994,797 | 2/1991 | Breeden ............................. 340/825.44 |
| 5,001,710 | 3/1991 | Gawrys et al. ......................... 379/265 |
| 5,029,196 | 7/1991 | Morganstein et al. ..................... 379/67 |
| 5,109,405 | 4/1992 | Morganstein et al. ..................... 379/89 |
| 5,163,087 | 11/1992 | Kaplan ................................... 379/142 |
| 5,166,974 | 11/1992 | Morganstein et al. ..................... 379/67 |
| 5,278,894 | 1/1994 | Shaw ....................................... 379/67 |

(List continued on next page.)

OTHER PUBLICATIONS

Bellcore Bell Communications Research binder, Switching System Generic Requirements for Interexchange. Carrier Interconnection Using the Integrated Services Digital Network User Part (ISDNUP), Generic Requirements, GR–394–CORE, Issue 1, Feb. 1994 (Generic Requirements GR–394–ILR Issue 1B, Jun. 1994–on first page in binder).

Bellcore Bell Communications Research binder, Generic Requirements for the Administrative System (AS)/Line Information Database (LIDB) Interface, Generic Requirements, GR–446–CORE, Issue 1, Dec. 1993.

Bellcore Bell Communications Research binder, Common Channel Signaling Network Interface Specification (CCS-NIS) Supporting Network Interconnection, Message Transfer Part (MTP), and Integrated Services Digital Network User Part (ISDNUP), Generic Requirements, GR–905–CORE, Issue 1, Mar. 1995.

Bellcore Bell Communications Research binder, Switching System Generic Requirements for Call Control Using the Integrated Services Digital Network User Part (ISDNUP), Generic Requirements, GR–317–GORE, Issue 1, Feb. 1994 (Generic Requirements, GR–317–CORE, Issue 1, Feb. 1994, Revision 1, Sep. 1994–on first page in binder).

Bellcore Bell Communications Research binder, Bell Communications Research Specification of Signaling System Number 7, Technical Reference, TR–NWT–000246, Issue 2, vol. 1 (Technical Reference, TR–NWT–000246, Issue 2, Jun. 1991, Revision 3, Dec. 1993, vol. 1–on first page in binder).

Bellcore Bell Communications Research binder, Bell Communications Research Specification of Signaling System Bell 7, Technical Reference, TR–NWT–000246, Issue 2, vol. 2 (Technical Reference, TR–NWT–000246, Issue Jun. 2, 1991, Revision 3, Dec. 1993, vol. 2–on first page in binder).

Harris Corp. Slide Presentation (25 pages)–date uncertain.

*Primary Examiner*—Duc Nguyen
*Assistant Examiner*—Rexford N Barnie
*Attorney, Agent, or Firm*—Standley & Gilcrest LLP

[57] ABSTRACT

A system is described in which a standard data field in a telephone system call format, such as ASI and/or dials number is changed to reflect caller and/or call specific information. The caller and/or calls specific information is made available to a called party, and elements of the telephone switching system.

12 Claims, 15 Drawing Sheets

U.S. PATENT DOCUMENTS

| | | | |
|---|---|---|---|
| 5,283,824 | 2/1994 | I-Nuoh Shaw | 379/142 |
| 5,289,542 | 2/1994 | Kessler | 379/142 |
| 5,303,298 | 4/1994 | Morganstein et al. | 379/67 |
| 5,311,572 | 5/1994 | Friedes et al. | 379/242 |
| 5,347,574 | 9/1994 | Morganstein | 379/210 |
| 5,416,833 | 5/1995 | Harper et al. | 379/201 |
| 5,422,941 | 6/1995 | Hasenauer et al. | 379/207 |
| 5,473,677 | 12/1995 | D'Amato et al. | 379/112 |
| 5,475,744 | 12/1995 | Ikeda | 375/127 |
| 5,479,494 | 12/1995 | Clitherow | 379/144 |
| 5,528,680 | 6/1996 | Karpicke | 379/354 |
| 5,546,447 | 8/1996 | Skarbo et al. | 379/142 |
| 5,550,904 | 8/1996 | Andruska et al. | 379/127 |
| 5,555,297 | 9/1996 | Ochy et al. | 379/136 |
| 5,590,184 | 12/1996 | London | 379/142 |
| 5,675,637 | 10/1997 | Szlam et al. | 379/142 |
| 5,684,870 | 11/1997 | Maloney et al. | 379/210 |
| 5,771,283 | 6/1998 | Chang et al. | 379/142 |
| 5,784,444 | 7/1998 | Snyder et al. | 379/142 |
| 5,805,688 | 9/1998 | Gillespie et al. | 379/142 |
| 5,864,612 | 1/1999 | Strauss et al. | 379/142 |
| B1 4,582,956 | 9/1994 | Doughty | 379/94 |

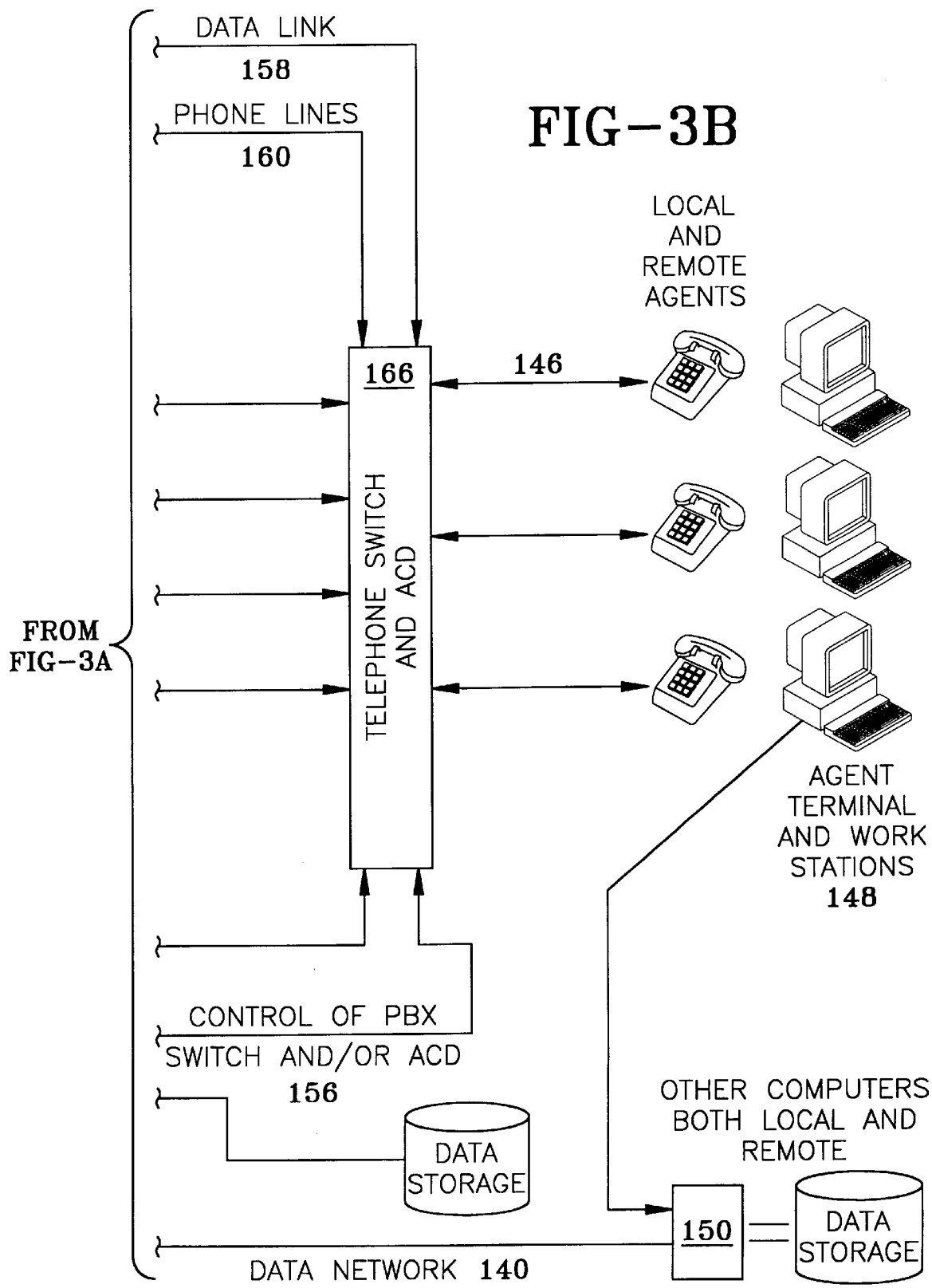

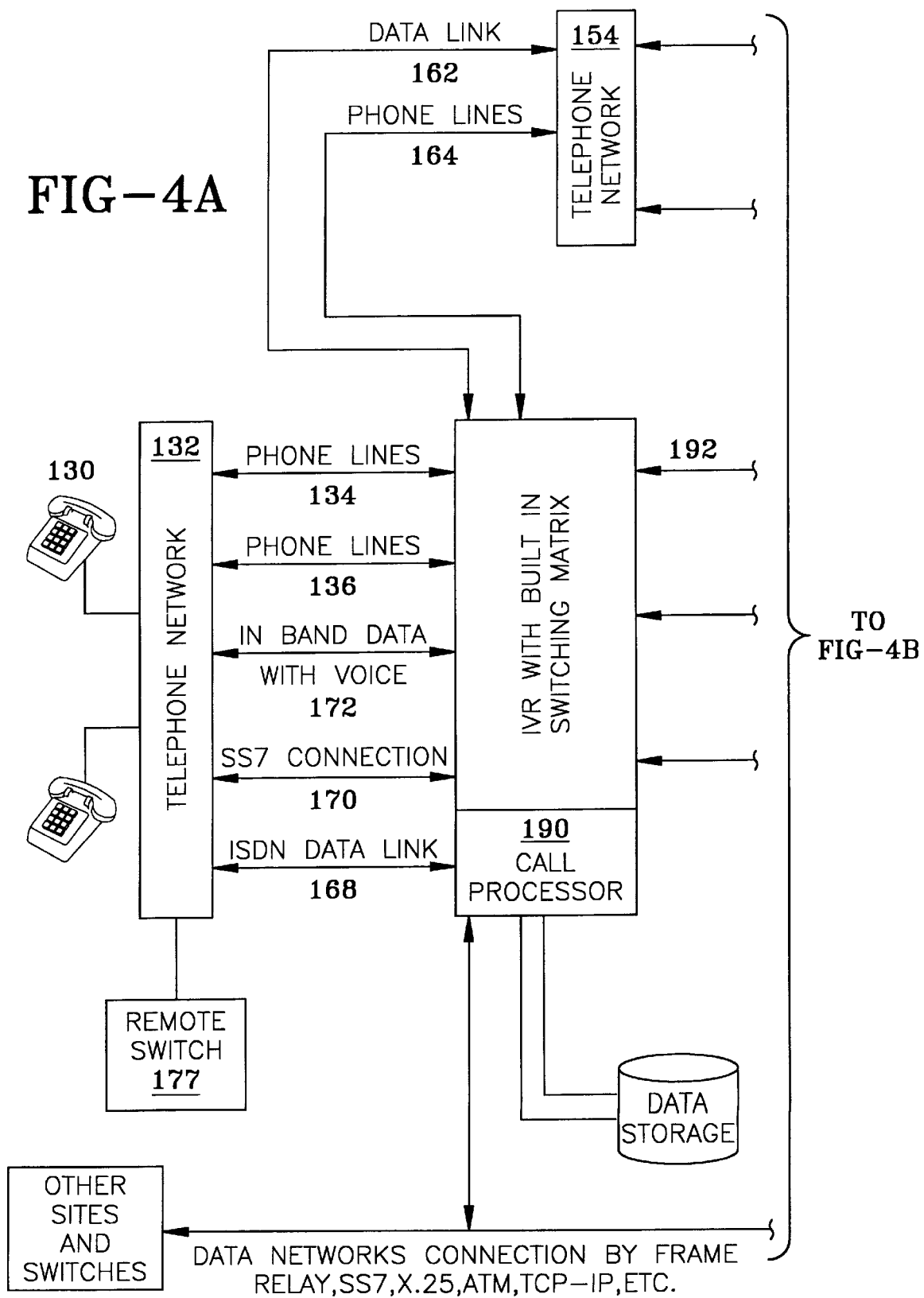

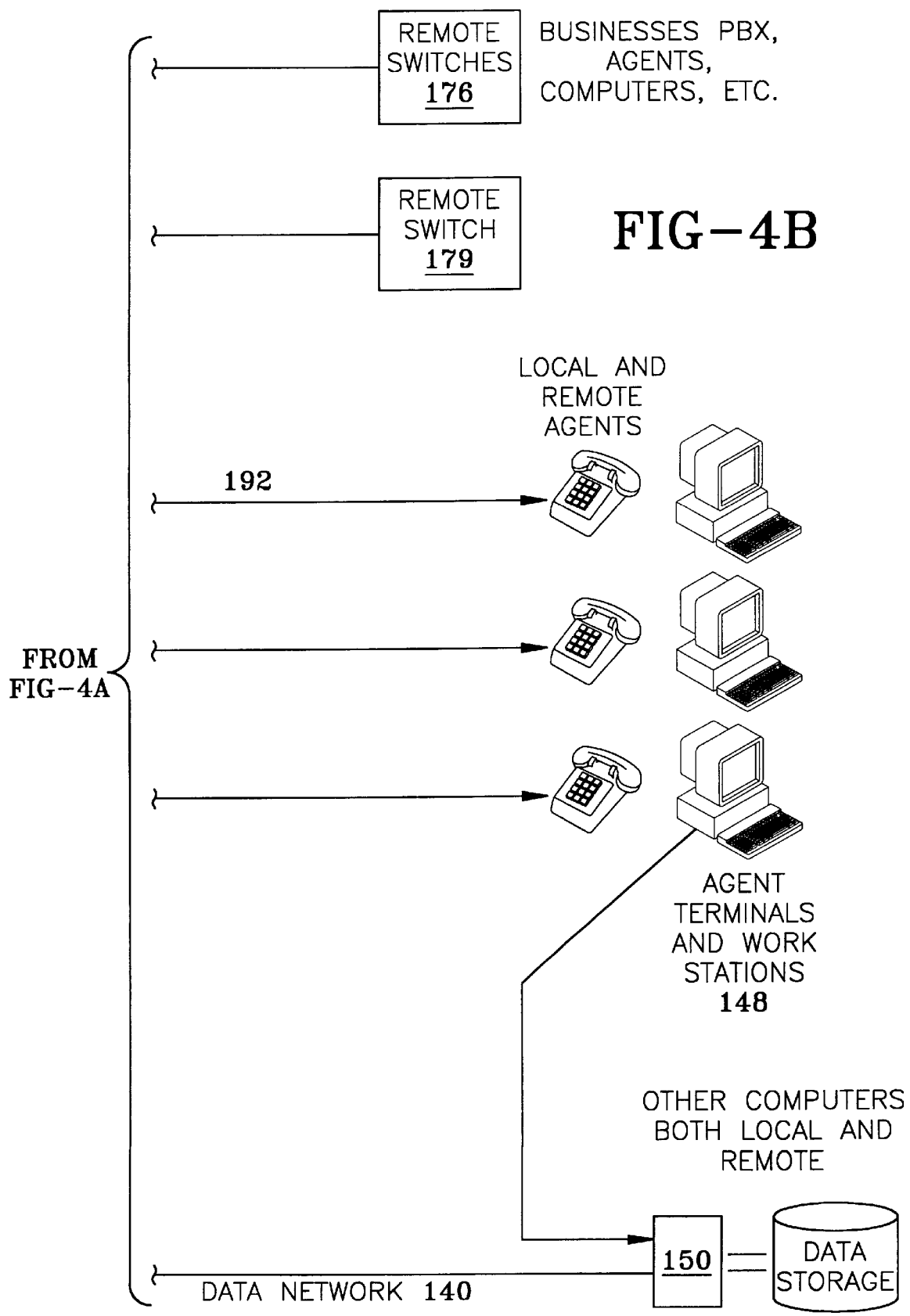

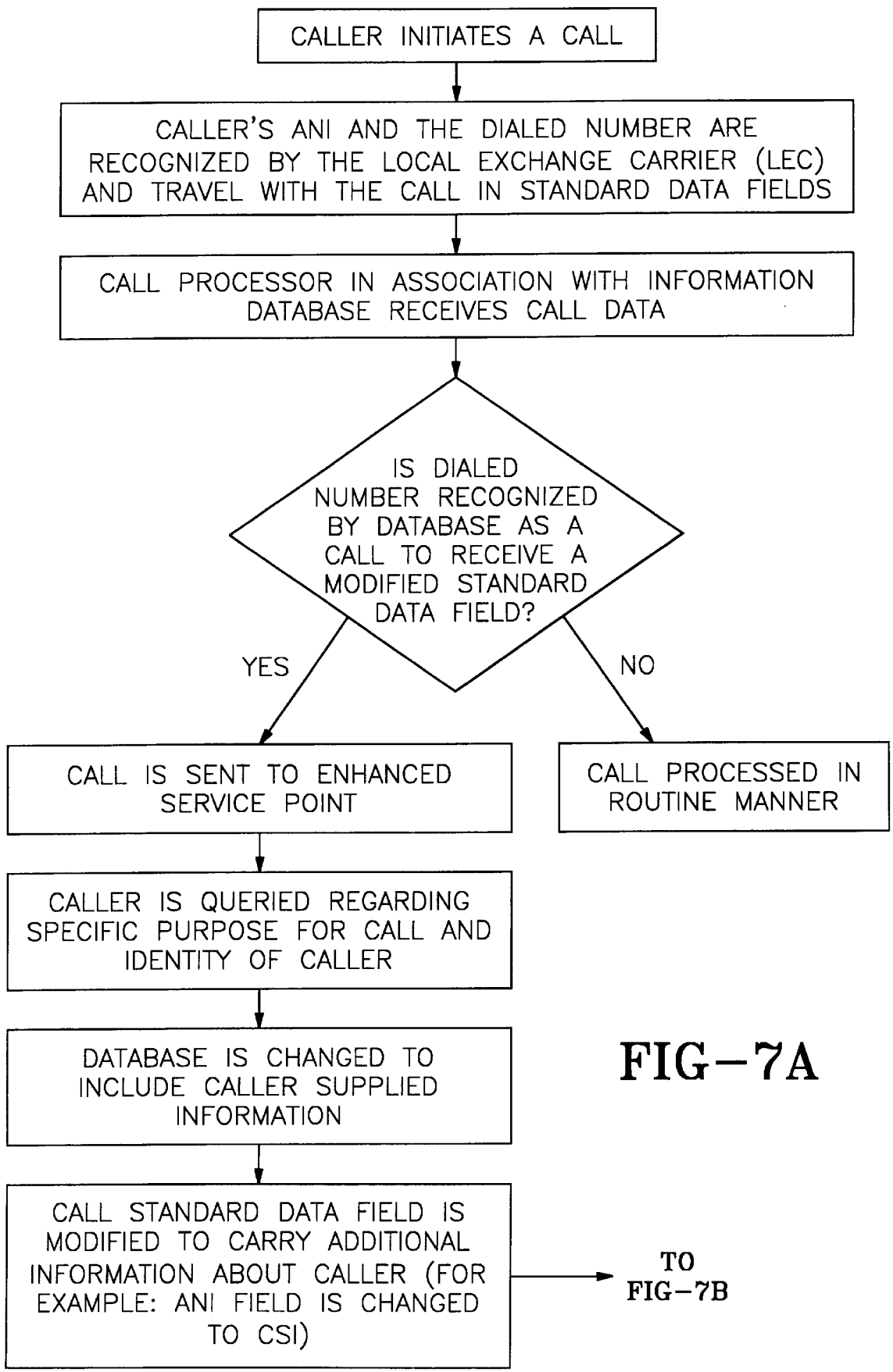

1) DEVICE "A" SENDS AN IAM (INITIAL ADDRESS MESSAGE) FOR A CALL AND/OR NON-CALL TO DEVICE "B"

2) THE DIALED NUMBER COULD BE THE ADDRESS OF DEVICE "B" ON THE NETWORK

3) THE ANI FIELD DOES NOT CONTAIN ANI, THE ANI FIELD CONTAINS SOMETHING OTHER THAN ANI THAT DEVICE "A" WANTS TO SEND TO DEVICE "B" THAT COULD ALSO REFERENCE OTHER DATA

4) THE NON-ANI DATA WAS INITIATED BY DEVICE "A" TO SEND TO DEVICE "B"

FIG-8

SYSTEM FOR PROVIDING CALLER INFORMATION TO CALLED PARTY VIA CALL STANDARD DATA FIELD

The present invention relates generally to the science of telecommunications. Particularly, the present invention relates to a system for providing advanced information to a called party about the calling party and/or call origination party, by providing coded data in the call identification data character field used in the telephone network call flow.

BACKGROUND OF THE INVENTION

For many years the telephone system in general has known certain information about the phone from which a call has been made. For example, the telephone system has known what area code the call was placed from, the long distance carrier of the phone call, and even the approximate geographic location for a non-mobile phone based on the first six digits of the caller's number, based on the Local Exchange Routing Guide of Bellcore (LERG), at which the phone call was made, if it was a residential or non-mobile phone. However, in reality, the extent of information that has been able to be collected about a calling party by the telephone system is quite low. For example, consider a home in which two or more people reside. If a call is placed from that home there is no way of knowing, as the call is handled by the telephone system, who is making the call. The only thing the telephone system may know is the approximate geographic location of a non-mobile phone and the calling number. The call may even have been placed by a visitor to the home.

The examples of lack of knowledge about the calling party quickly expand when one considers phone calls originating from institutions (for example, hotels, hospitals, airports, offices, prisons, universities, etc.). Then consider mobile phones (Personal Communication System (PCS)/Service), air phones, maritime phones, and cellular phones, and it soon becomes apparent how little information is really known about a calling party. A public phone (such as a pay phone) in a lobby of an institution, provides little if any information about the calling party especially if the calling party is paying cash for the call.

Businesses have attempted to learn more about a calling party by asking questions of the calling party when their call is received. For example, a rental car company receives a call from a person wanting to rent a car. A live attendant for the rental car company will collect information about the caller by asking several questions. Consider that the caller is likely to have rented a car previously from the same company. There should be no need to have to re-ask all of the same questions every time the same caller wants to rent a car. Also consider the situation when the caller who is calling to rent a car, during the same call, requests information that is not known by the first attendant and the first attendant must transfer the call to another attendant such as a supervisor. Frequently in such situations it is necessary for the caller or the first attendant to have to repeat all or much of the caller's basic information to the second attendant. This unfortunate waste of time and resources goes on every day in calls occurring all over the world. The present invention provides a solution to this and related problems of telecommunications.

The telephone system has evolved to include limited standard identification information about the calling phone (calling number and/or ANI) and the phone that was called (dialed number). This information is primarily obtained from the telephone number from which the phone call was placed and the telephone number that was dialed by the caller. The telephone system has recognized these two numbers as basic information sources (for routing calls and for billing purposes for example) and has developed a system of standards for the data character fields these numbers are to fill. The following background information will better explain these standards of limited phone identification used today by the telephone system of the United States and as it applies to the international standards as well.

Automatic Number Identification

Automatic Number Identification (ANI) is a basic element of telephone calls transported throughout the public and private telephone networks. For the North America Numbering Plan (NANP), it is currently 10 digits long. ANI is used extensively for:

call routing
 call billing
 call tracking
 call identification.

Call Routing Based on ANI

Area Code Routing based on the calling phone number is a common feature found in most long distance telephone networks. Based on the calling party number (ANI) the call can be routed and/or receive special treatment by telephone switches, the phone network, and equipment. Some Interexchange Carriers (IXC's) (such as AT&T, MCI, Sprint, etc.) and Local Exchange Companies (LEC's) (such as Ameritech) provide many enhanced forms of call routing usually based on the first 3 or more ANI digit screening:

Call routing based on the first 3 ANI digits is usually referred to as Area Code Routing. For example, if the calling number ANI was 614-847-6161, then Area Code Routing would consider the "614" part of the ANI and route the Ohio originated call using the "614" as the broad geographic data element to start the routing routines and calculations, based on the routing rules and other factors (agents available, busies, lines available, time of day, day of week, percent allocation, and other factors).

Call Routing based on more than the first 3 ANI digits allows for more geographic precision. Most ANI's have a geographic relationship. Bell Core publishes a LERG (Local Exchange Routing Guide) that gives the approximate longitude and latitude for the area code/exchange (as well as other data contained in the LERG) represented by the first 6 digits of the ANI. For example, for the calling number 614-847-6161 the "614-847" component has the geographic representation of Ohio and the metropolitan area of North Columbus/Worthington. The Area-Code-Exchange (NPA-NXX) Routing ability gives even greater routing definition for the calling party (ANI). If a caller to an 800 number with an ANI of "614-847-6161" was in need of being connected to a towing service, then the geographically closest towing service might be identified to handle the towing job (at a shorter travel time and possible lower cost).

Call Routing can be based on the first 6 ANI digits or more. In fact, call routing can be extended to the first 7, 8, 9, or 10 digits to even focus on a single calling telephone number. For example, calls originating from "614-847-6161" could be assigned to a specific travel department within a company. The caller with that ANI could be routed by the telephone network to a certain group that always handles that travel department when that caller dials the local, 800, 500, or other number of a travel agency which routes calls using ANI. In this case, a specific ANI or set of ANI's is given a defined routing algorithm, or treatment, when recognized by a controlling network to route the call based on ANI or a group of ANI's.

Call Billing (Line ANI and Billing ANI)

ANI (as a term) is used, quite often interchangeably, for both the call originating billing number and/or the line number for the originating end of a call. For a location that has only one telephone line and one number (such as a residence with only one line), ANI usually refers to both the calling line and the billing number.

For a multi-line location (such as a business or residence with 2 or more lines), a PBX (Private Branch Exchange, a location's switch), or Centrex (where the local telephone company's switch or a separate switch acts as a PBX), the billing number or the lead number may be presented by the public telephone network as the ANI for the actual line used to place the call. For example, for a multi-line location such as a business, the public telephone network may present all the out-bound calls with the same ANI as the billing ANI even though multiple lines are in use, each with their own assigned line ANI and most of which are different than the billing ANI. The billing ANI is usually a good geographic representation of the non-mobile caller and usually represents the responsible (billing) party for the call (or one of them). However, in some cases, the billing ANI may not represent the actual ANI (or line number) of the call. In other cases, the billing ANI may not be presented and the line number ANI is presented instead. In any case, the line ANI or billing ANI never defines 100% of the time who is calling or why they are calling.

The ANI of the call may not even be a good geographic representation. For example, when a call is routed through a private network before it reaches the "Public Telephone Network", the ANI may have no relationship with the physical location or approximate identity of the caller. If the caller at one location calls through a tie line or on a "Private Network" to another location and then access the Public Network from the second location, the call will probably be identified by an ANI based on the point at which the call entered the Public Telephone Network of the second location. For example, if a caller in Columbus, Ohio accesses a switch in New York City through a private network and then accesses dial tone to reach the Public Telephone Network through the New York City switch, the ANI for the call will most likely be a New York City ANI and the bill will be based on the New York City ANI (distance, identification, location, bill to, etc.)

The caller's ANI (billing number and/or line number) is directly used for billing for calls dialed to:

900 access code type calls (e.g., 1-900-WEATHER)
  500 access code type calls (e.g., 1-500 personal communications which currently can be billed to the caller)
  10XXX access code type calls (e.g., 10288 where the caller dials an access code to reach a carrier and then dials a number)
  1+ long distance number type calls per the caller's prescribed carrier
  411, 1-555-1212 and many other access codes, methods and applications The caller's ANI is indirectly (and sometimes directly) used as part of the billing equation for calls where the Dialed Number pays for the call:

collect calls
  1-500 (depending on features)
  1-700 (depending on features)
  1-800 (e.g., 1-800-SCHERER)
  other access methods, codes, and applications where the ANI is used, but the caller is not billed for the call (1-800-COLLECT, 1-800-CALL ATT, etc.).

For 1-800 access code calls, the caller's originating ANI is used to control some of the billing decisions—for example:

Intra-state
  Inter-state
  origination from a different country or island (e.g., calls from Canada) time zones
  mileage between calling parties and mileage bands. 1-800 access service was introduced by AT&T around 1967. From that time on, the caller's originating ANI became an integral part of the billing, routing, and call detail. 1-900, 411, and other pay-per-call numbers have also been around for 15 or more years and use the caller's originating ANI for part of the billing equation.

Call Tracking

ANI, along with Dialed Number including date and time, may be used as an approximation to track calls. However, if 2 callers dial from a PBX with a common billing ANI at the same time to the same multi-line location and both callers hang up at the same time, 2 call records will be created that look the same (even though there were 2 calls). Caller ANI, even with Dialed Number, date, time, and duration, do not provide exclusive call tracking, nor who was calling.

Most advanced PBX's, ACD's (Automated Call Distributors), network transferring features (such as AT&T's Transfer Connect), PBX call transferring, and other forms of call switching and call transferring—preserve and transfer the caller's ANI (if possible) in the transfer of a call. This is done to preserve this piece of network provided data to the next call location, in an attempt to better serve the caller, and to help identify the caller. ANI preservation and passing has been a feature of Computer-Technology Integration to manage calls.

Caller Identification

One of the most wide spread and well-known uses of the caller's ANI is Caller ID (Caller Identification). The concept of Caller ID is to pass on to the recipient of the call the ANI of the caller before the call is answered. ANI has been a key component of ISDN (Integrated Services Digital Network) defined by the CCITT in the 1970's. The caller's ANI has traveled the phone network since the 1970's, if not earlier, in the form of two products:

1) 1-800 Access Type Service
  2) Integrated Services Digital Network (ISDN Service).

Many companies, businesses, and individuals use ISDN, digital access, and/or Caller ID to get the data elements of the call—one of which is caller ANI. Despite the benefits of ANI, caller ANI does not define the actual calling person. Even for a single line phone at a residence, ANI does not indicate which member of the family or a visitor is using the phone. Pay phones, businesses, and PBX's serve as gateways for an even larger number of individual people or equipment using a calling number's ANI. At best, caller ANI provides an approximation to the geographic location and an educated guess as to who may be calling. It does not indicate why the caller is calling.

The ANI of the caller is preserved and passed on as the call passes through the Public Telephone Network (and usually the Private Telephone Network, if possible). For example, the caller ANI may traverse through the LEC, IXC, CAP (Competitive Access Provider), PBX, ACD, Agent and so forth, so the final recipient receives the caller's ANI (i.e., caller ID).

Dialed Number

Dialed Number is the number that the caller dialed. Dialed Number, like ANI, must comply with the North America Numbering Plan (NANP) and the CCITT International Standards if the call is to originate and use the public switched telephone network of the U.S.A., Canada, North America (NANP) and international locations. Examples are:

| | |
|---|---|
| 847-6161 | 7 digit dialing within the Local Access and Transport Area (LATA) where the area code is assumed to be the same as the local area code (i.e.: 614). With multiple area codes for the same LATA coming into existence, 7 digit dialing will be phased out in some areas to 10 digit dialing. |
| 809-776-8500 | These are examples of 10 digit dialing geographic numbers. The 809-776 indicates a phone number in St. Thomas, a U.S. Virgin Island. |
| 614-847-6161 | |
| 1-800-356-6161 | These are all examples of non-geographic routing numbers where the carrier and/or telephone network that has handled the call checks a database for the designated termination and associated routing. |
| 1-900-932-8437 | |
| 1-500-422-7537 | |
| 1-700-328-5000 | |
| 911 | These are examples of local special purpose Dialed Numbers that again have specific routing and geographic assumptions. |
| 411 | |
| "0" | |
| 011-44 | International Dialed Numbers that start with international access, country code, and then the number (city, line, etc.) in the designated country. |
| 011-72 | |

For North America and the countries (including the U.S.A.) which are using the NANP, the public switched telephone network requires the Dialed Number to conform to the NANP. The Dialed Number is passed on to each successive party of the transport of the call (LEC-IXC-LEC-PBX-ACD- etc.) so the call can go through the telephone network being routed to the destination and for call accounting purposes.

Dialed Number Identification Service

The Dialed Number Identification Service (DNIS) uses a shortened presentation form of the Dialed Number. When the incoming call is terminated on digital access (and other forms of special access), the transport provider will usually offer DNIS to help identify what number was dialed for an incoming call to the target telephone equipment and location. If the Dialed Number was, for example, 1-800-356-6161, then 6161 may be sent with the call presentation to reflect the 10 digit number dialed to give special treatment, routing, and information for the incoming call. The DNIS assigned could be from 1 to 10 digits or more (but usually not more than 10) and does not have to be the same as, or part of, the Dialed Number. In the above example, for the 800 number 1-800-356-6161, the DNIS could be "100" or "2" or the number itself.

A common use of DNIS, besides representing the Dialed Number, is to aid in routing the calls within the telephone equipment so multiple different Dialed Numbers can share a common access trunk group and a common routing and still receive selective routing and unique Audiotext greetings and selective handling. For example, within a business one 1-800 number may route to sales while a different 1-800 number for the same company routes to customer service, but calls to both numbers share the same or parts of the same trunk group to improve network, access, switch and telephone equipment utilization.

Dialed Number Routing

For the traditional geographic Dialed Number 411, 911, 614-847-6161, the public switched network will attempt to deliver the call to a primary location, and if the local phone company and/or the IXC offers advanced features (Call Forward on Busy, Call Forwarding, Call Forward on Ring No Answer, and other possible static and dynamic delivery options), the call can have special "pre-designated routings" that are mostly static in nature.

For non-geographic Dialed Numbers, such as 1-800, 1-900, 1-500 (PCS Follow Me), and other non-geographic Dialed Numbers, the routing is controlled by the local access provider's (LEC) accessing local databases to hand the call to the appropriate IXC (interexchange carrier) for providing inter-LATA (and intra-LATA) services and network routing and utilizes the traditional public telephone network supplied ANI plus Dialed Number(s) as some of the key data elements.

In both cases (geographic and non-geographic Dialed Numbers), the telephone network currently uses the public network supplied ANI and/or Dialed Number to determine call routing and special call treatment. Up until now, both the ANI and Dialed Numbers were fixed or static in nature, and are located in predesignated fields of the actual call data.

The USA Network and Many International Telephone Networks Support CCS7 Signaling A CCS7 (Common Channel Signaling 7) network consists of nodes called Signaling Points (SPs). Unique point codes for each network SP serve as the address for message distribution. A typical CCS7 network (as referenced in FIG. 6 herein), has three key nodes:

a Service Switching Point (SSP) capability at a central office provides CCS7 trunk signaling and/or queries a database to determine call routing a Service Control Point (SCP) houses a database with the routing information used by network SSPs a Signaling Transfer Point (STP) provides routing capabilities for CCS7 messages between CCS7 nodes The North American network will be based on the basic "Mesh" structure. This structure is sometimes referred to as the "Quad" structure.

The hub of the network will be STP pairs. These are two separate STP nodes operating together in a logical arrangement for redundancy.

The Signaling Links can be categorized into several types depending on the functions being performed. However, regardless of the function being performed, all Signaling Links operate in the same manner and have the same technical requirements.

A-Links (Access Links) are used to allow SSPs, SCPs and SPs to connect STP nodes.

B-Links (Bridge Links) are used to join mated STP pairs to other mated STP pairs.

These Links form the Quad structure, which will provide complete STP redundancy.

C-Links (Cross Links) are used to interconnect two STP nodes, in order to create an STP pair.

D-Links (Diagonal Links) interconnect primary and secondary Signal Transfer Point pairs. They provide communication between pairs and serve as an alternate routing path.

A two level hierarchy in an extension of the basic mesh structure.

Some networks, typically those with high levels of sub-network traffic volume, may require another level of STP pairs. This Primary level of the STP architecture would also be a convenient place to bridge signaling boundaries (i.e. from one operating region to another). Most CCS7 nodes will be connected to the network at Secondary level STP pairs, except SCPs may be connected at the Primary level.

D-Links (Diagonal Links) are used to form connections between Secondary level mated STP pairs and Primary level mated STP pairs. This forms a Quad structure as well.

Private Dialing Plans

AT&T in 1985 introduced its Software Defined Network ("SDN"), MCI offers Virtual Private Network ("VPN") and others offer private dialing plans (e.g., switch to switch) that may not conform to the public network. "On Net", a Private Virtual Network term, represents a dialing plan that may or may not conform to the public switched network (NANP). These private telephone networks are preprogrammed to receive calls over dedicated and special access and to look for the unique "Dialed Numbers" that can even look like public Dialed Numbers. The private numbers are translated and routed differently (or can be routed the same) as the public network. For example, dialing 1-614-847-6161 on a private telephone network could ring to a phone in New York City (or anywhere) instead of the expected geographic location of the Columbus area in Ohio.

SUMMARY OF THE INVENTION

The present invention recognizes deficiencies in the use of calling/billing line number to identify a caller and/or call (ANI). The use of calling/billing line number does not indicate the actual identity of the caller. Furthermore, it does not indicate the specific purpose of the call. Changes to data elements in the telephone network's call flow, however, may be used to more accurately indicate the caller's identity and the purpose for the call so that the called party and/or location may expedite the processing of the call. Therefore, the present invention is a system for replacing all or a portion of the existing caller identification data (caller ID also referred to as the calling number and/or ANI), or modifying the caller ID, and/or having the modified caller ID act as a reference to data stored elsewhere such as in the Initial Address Message (IAM) user-to-user field and/or in an external database, with "Caller Specific Information" ("CSI") data to occupy the caller ID or ANI field, and this CSI data will travel in place of the ANI data in the Public Telephone Switched, Private, Signaling System 7 ("SS7 and/or CCS7"), ISDN or any other network that supports this data format.

For example, if the 10 position ANI field is not sufficient to hold the Caller Specific Information (CSI), then the network provided caller ANI data may be replaced with a "Caller Specific Account Number" ("CSA") that directly references the CSI which can be requested as needed from an on-line data storage (or multiple on-line data resources).

The present invention also may be used to replace or modify all or part of the Dialed Number in the Public Telephone Switch, Private, Signaling System 7 ("SS7 and/or CCS7"), ISDN or any other network where the Dialed Number (domestic U.S.A. or International) traditionally reflects the number dialed by the caller, to change the routing of the call, change the handling of the call, or to pass on enhanced data about the call. By modifying the Dialed Number, the call may be routed according to the new Dialed Number. Modification of the Dialed Number may change the handling of the call so that it may be given a different treatment both within the network (e.g., redirect on busy, priority call, etc.) at the customer's location (priority call), for example, and outside the network. Finally, the dialed number may be modified to pass on enhanced data known and/or collected about the call in addition to the enhanced data that may be carried in other fields (e.g., CSI & CSA and user-to-user).

In addition to placing special information about the caller and the call's purpose in the Dialed Number field and/or ANI field for example, the present invention may be used to reference or cause the telephone network and/or telephone switches and equipment to recognize data in the "user-to-user" data field of the ISDN and/or SS7 and/or CCS7 or Initial Address Message ("IAM") of the call. For example, the "user-to-user" data field may be used to store the extra and/or special data for this call as well as the original ANI, dialed number, account number, and other information. The control network recognizes this based on data in the call such as the "CSI" in the ANI field. The CSI and/or CSA and/or modified dialed number may also refer to or be used as a key to data stored outside the call flow or telephone network as external data. The external data may be retrieved at various points including before the call is answered, during the call and after the call is completed.

By use of the present invention, a called party can know significantly more information about a caller before even answering the phone call. The CSA or CSI may be completed by a call processing company, equipment and/or function connected to, attached to, and/or in the telephone network, before the call arrives at its intended destination. The called party may then access the CSI or CSA electronically as it arrives with the call. By cross checking the CSI or CSA data against a database as part of the phone network and/or external to the phone network where some or all of the caller information that has been collected has been stored, the called party may receive substantial information about the calling party before, during and after talking with the calling party and/or handling the call, as needed. The calling party information may be displayed on a computer terminal, for example, that is in view of the called party.

If the calling party is in need of speaking with another party other than the party who received the call (for example, when a sales attendant takes the call and the caller also has questions for a supervisor or manager), the caller's information may be readily transferred electronically to the second call receiving party and neither the caller nor the first call receiving party will have to repeat the information already collected from the caller. The modified ANI (CSI) would flow with the transfer and could reference already collected data.

The collection of information about the caller, to create the CSI or CSA, need only be done once and may then later be updated from time to time as needed. For example, if a caller is calling to rent a car, the caller's personal information (for example, address, phone number, rental insurance needs, credit card, etc.) can be collected and stored in a database, once by an agent for the rental car company, and assigned a CSI or CSA number (e.g., the rental car company's customer number). From that time forward, if any of the caller information changes, only that specific change needs to be updated in the database, which takes far less time than taking the information all over again every time the caller calls.

Once the CSI or CSA is created for a particular caller and dialed number, every time that caller calls that dialed number and identifies who is calling and why, for example their frequent flyer number, their car rental number, the caller ID (ANI) will be replaced with the CSI or CSA which will travel with the call. In other words, a caller may have several CSI or CSA combinations (which could be equal to their customer number for that vendor). As an example, a caller may have a CSI or CSA for his rental car company and a different CSI or CSA for his favorite airline, each being automatically invoked upon recognition of the dialed number of the rental car company and the airline respectively and the identification of the caller (not the ANI, but the customer number for that vendor). Or, the CSI or CSA may include sufficient information to be used by a number of different types of called parties in which it would be invoked automatically upon recognition of the caller ID.

The database to store the information on respective callers may be resident practically anywhere that the called party has electronic or other form of access. This includes at the called party's location, or at a remote site where it may be operated by an agent for the called party or as a feature of the telephone network.

The CSA or CSI will preferably occupy a standard data character field recognized by the telephone system, such as the ANI field. In this way, the CSI and CSA will not interfere with or disrupt telephone traffic over the public and private telephone networks, since the networks will still only see the standard data fields and will not reject CSI and CSA since they will not fall outside of the standard accepted data fields in size or content ranges.

BRIEF DESCRIPTION OF THE DRAWINGS

FIG. 4 shows a call processing flow of one embodiment of the present invention in which an interactive voice response unit is a part of the telephone switch;

FIGS. 7A and 7B show a flow diagram of a preferred embodiment of the system of the present invention;

FIG. 8 shows another embodiment of the present invention for handling a call or a non-call, with Device A sending an Initial Address Message to Device B.

DETAIL DESCRIPTION OF PREFERRED EMBODIMENT(S)

Figure 1A:
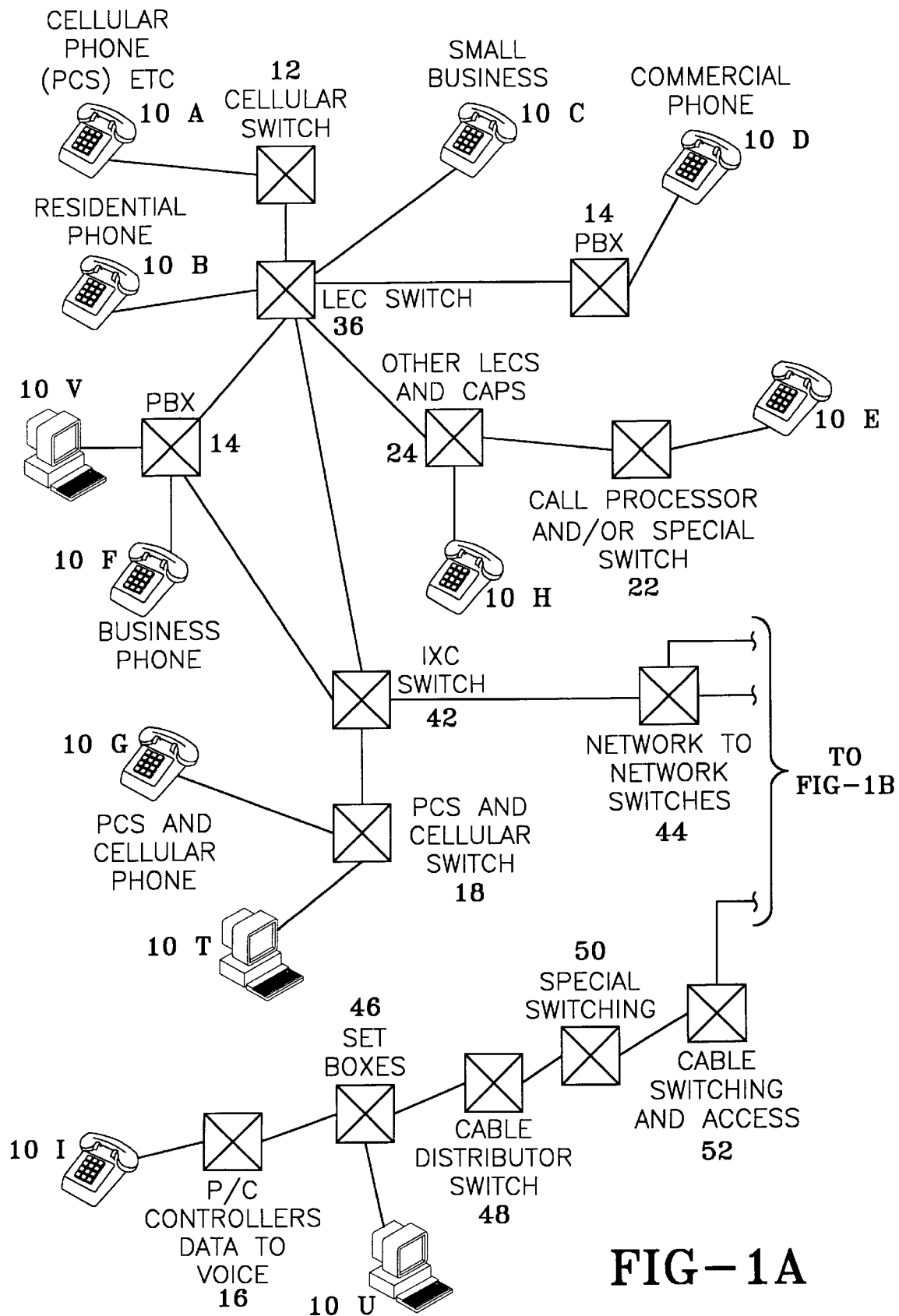
FIG. 1 is a block diagram of the primary elements of a telephone network and where one embodiment of the system of the present invention may be implemented.
Figure 1B:
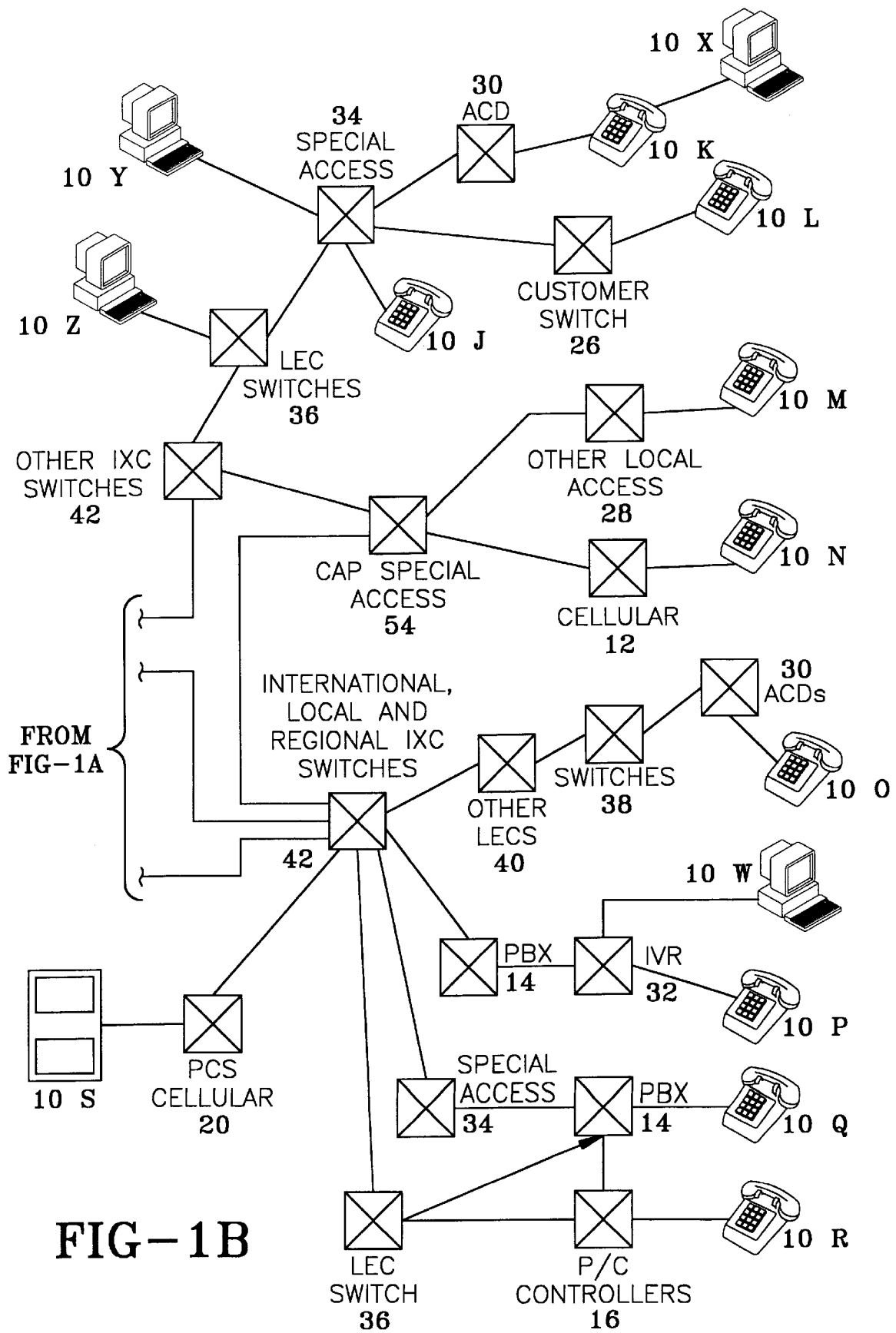

Referring now to FIG. 1, a block diagram of the primary elements of the telephone network may be used to illustrate the flow of telephone calls through the network. Calls originate and terminate at devices or terminals 10 such as residential telephones, business telephones, cellular telephones, personal computers and commercial telephones. Calls are routed through a number of devices capable of transporting calls before reaching their destinations. For example, a call placed at a residential telephone 10b may be transported by a switch at the LEC 36 to an IXC switch 42, to a Network to Network switch 44, to a local IXC switch 42, to a PCS cellular switch 20, and finally, to someone's cellular phone 10s. In another example, a call placed at a business phone 10f may be transported by the business's PBX 14 to the LEC switch 36, to an IXC switch 42, to a PCS/Cellular switch 18, and finally, to a cellular phone 10g.

FIG. 1 is merely illustrative of the types of devices and equipment that comprise the public interexchange carrier, other IXC's, other forms of access, and private telephone networks through which telephone calls in accordance with NANP are routed and in which the present invention may be employed at various locations. An important attribute of each device is that it is able to communicate with the other devices with which it is coupled. The devices within the telephone network communicate in accordance with protocols that define the procedures for communication so that communication paths between devices may be established and maintained. It is the use of well-defined protocols and call formats such as those defined for SS7, ISDN, etc., that allow the ANI and Dialed Number information in each telephone call to be transported throughout and understood at various points in the network, both domestic and international.

In a SS7 network, for example, calls are usually routed using a Service Control Point (SCP) which is a centralized database that contains the usual information necessary for handling and routing the call. The SCP looks at both the Dialed Number (and ANI if required) of the call to apply that SCP's rules for call routing (e.g., geographic routing, time of day, busy, call overflow, etc.) Knowledge of the SCP's expected call flow may be used to change call routing, priority, and treatment through modifications to the values of the ANI field and/or Dialed Number field in accordance with the present invention. The modified or changed Dialed Number may work in conjunction with a SCP (or its equivalent in a SS7 network) to provide unique, special, and exclusive features and/or special treatment for the call. The modified or changed Dialed Number may be used to identify special calls to the SCP (or its equivalent in the SS7 network) and/or trigger special call handling for such special calls recognized by the SCP. The modified or changed ANI (CSI and/or CSA) may work in conjunction with a SCP or its equivalent to provide unique, special, and exclusive features and/or special treatment for the call. The modified or changed ANI may be used to identify the special call(s) to the SCP or its equivalent and/or trigger special call handling. Finally, the modified or changed ANI (CSI and/or CSA) may be used to reference additional call data to the SCP or its equivalent to provide special routing, handling, logging, and treatment of the call.

The use of a common telephone call format (i.e., NANP and CCITT) and supporting protocols that preserve the format, allow the ANI, Dialed Number, "user-to-user" data fields to be modified or replaced in accordance with the present invention anywhere in the call flow and/or at multiple places in the call flow. In one embodiment of the present invention, data fields of a telephone call may be modified by the equipment or device currently processing the call. Referring again to FIG. 1, data fields of the telephone call may be modified or replaced at a PBX 14, P/C controller 16, switch 12, 18, 20, 24, 26, 36, 38, 40, 42, 44, 48, 50, 52 local or special access devices 28, 34, 54, ACD 30, IVR 32, call processor 22 or set box 46. The data fields may be modified at the point of call origination if the caller has special equipment. Specifically, the ANI data, or caller ID standard data field, may be modified or replaced with CSI and/or CSA and/or the Dialed Number may be replaced and/or modified with a new Dialed Number:

at the call origination point (10a–10z), if the caller's equipment has SS7 and/or ISDN capabilities (i.e., the call has the ability to select its own "ANI" or replace it with his account number, password, reference number, etc. thereby directly creating his own CSI/CSA and/or modified Dialed Number);

at the local telephone company 36;

at the local IXC access 42 to the local telephone company;

at any point in the IXC network or international network and international switches;

at points between telephone/network switches, nodes, and SCP's, or at points within the IXC or call handling network;

at special platforms and facilities anywhere in the call flow, by live agents and/or automated agents and/or IVR equipment;

at the point at which an IXC passes the call to another IXC or CAP;

at the point at which the IXC hands off the call to the terminating LEC, Local Transport Provider, and/or customer;

at the LEC end office, before reaching the customer premises;

at the customer premises; and at ACD, IVR, call processor or switch equipment at the customer premises or elsewhere.

The existing equipment and devices at these various locations are capable of interpreting the data fields in the telephone call and therefore, may also modify the data fields as the call is processed and passed through the equipment. As long as the overall format of the telephone call is preserved, the data fields of the telephone call may be altered at various locations during call transport.

In an alternative embodiment of the present invention, switch and telephone equipment on-line messaging capabilities (e.g., SS7 messages, ISDN maintenance messages, Asynchronous Transfer Mode (ATM), X.25, frame relay, or any other data or packet technique) may be used to modify or replace telephone call data fields. A message originating from a first device in the network is routed to a second device in the telephone network where the recipient second (third, etc.) device changes, modifies, replaces, overlays, or updates the Dialed Number and/or ANI with modified and/or new values other than those originally entered, dialed, and/or captured, so the future routing, transferring, handling, and/or data referencing of the call is now accomplished and/or related to the replaced and/or modified ANI and/or Dialed Number referenced for the call. The second recipient device modifies the specified data field according to the contents of the message from the originating device plus other data, inputs and information available. The second device now communicates to the first device or prior handling devices using a data packet network described to modify the data stored about the call in the first or earlier device, so that the values stored in the first or earlier device reflect some (or all) of the values assigned by the second or later device. In this example, the data stored in prior call handling switches is also being modified, changed and/or updated Special information about the call and the caller may be placed in the ANI and Dialed Number fields as well as the "user-to-user" data field of the ISDN or SS7 or Initial Address Message (IAM) of the call. For example, in the ANI field, the originating caller's telephone number may be replaced with "Caller Specific Information" (CSI) such as an account number, social security number, or any unique caller (customer) identifier that may also reference data in the user-to-user data field of the IAM and/or external databases. In the event additional caller data is required for processing of the telephone call throughout the network or at the final destination, the new value in the ANI field may be a "Customer Specific Account Number" (CSA) that serves as a reference to Customer Specific Information (CSI) stored in the user-to-user of the IAM and/or in an external database location(s). The extra and/or special data stored in a data record external to the call (and/or in the IAM user-to-user field) may be retrieved based on data in the call (e.g., CSI or CSA and/or modified dialed number) at several points in time including:

before the call is answered;

before the call is answered at a new location, but has been answered previously and data has been collected and stored whether answered in the network and/or at one of the terminations (this could occur multiple times);

while the call is being answered;

while the call is being or attempting to be transferred, partially based on the stored data;

any time during the call; or any time after the call.

Stored data external to the call (that may be referenced before, during, and/or after the call) may actually represent a repository of call data collected by multiple sources and tied to the call based on "CSI" or "CSA" and/or modified dialed number. Such external call data may include, for example:

Dialed Number

Original ANI

Geographic data and start time of call

Duration of call

Exact call tracing data (e.g., originating switch, access method, unique switch line number, port, date, and start time of call)

Other network data

Customer provided data such as:
  Frequent flyer number
  Account number (any type)
  Social Security Number
  Spelling of last name
  Any unique customer identifier including a Voice Print
  Any other customer provided data too numerous to list here (e.g., as collected by Interactive Voice Response ("IVR") equipment using touch tone, pulse dial, and speech recognition, live and/or automated agents.)

Agent entered data (e.g., as keyed by a live or automated agent, as provided by the caller (e.g., as by his PC program), as collected by a live agent intercepting the call flow to ask questions, as by a terminating and/or transferring agent(s) who asks questions and collects knowledge about the call and the caller.)

Prior knowledge data as added to the current call data:
  set preference from a prior linked profile (e.g., type of car and insurance status as linked from caller's entry of an insurance policy number, seat preference, credit card number, etc.)

The stored data and information accessed on-line (before, during, or after the call) may be referenced using all or part of the following fields:

modified or replaced ANI modified or replaced Dialed Number unique tracking number stored in the
  modified ANI field
  modified Dialed Number field
  user-to-user field of the IAM
  any other user-to-user data sent during or after the call that carries a unique tracking number to reference other data about the call (e.g., termination or disconnect SS7 message and/or ISDN message may contain user-to-user data as well as facility and/or maintenance message or other message types (ISDN, SS7, ATM, X.25, etc.) during the call any other standard recognized telephone system field including fields that may become standard for CSI, CSA, or modified dialed number.

Stored data may be located in databases at any of the following locations:

customer premises databases remote from customer premises (e.g., telephone service provider)

server sites for one or more customers locations within the call flow network where call flow data elements are modified and or replaced locations that store other data in addition to call reference data (e.g., LEC's Line Information Database)

other locations not covered by the above.

Databases may also be replicated across various locations. For example, data stored at a service provider's facilitates may be replicated or a subset may be replicated at a customer's premises. All the data in a database or only a subset of the data may be replicated across multiple locations as needed.

The caller may be prompted to, or through prior knowledge regarding the call knows to provide additional input of data or information that becomes part of the call data through the use of ANI field changes to "CSI", "CSA" and/or Dialed Number changes, and/or stored data. The ANI field of the call—which is preserved and travels with the call—when modified in accordance with the present invention may truly represent the caller.

Changes to the ANI and/or dialed number fields may necessitate changes to billing systems that use ANI and/or dialed number for billing information. Billing systems may instead reference the original dialed number and modified dialed number, and/or the original ANI and the modified ANI, call duration plus any other necessary data stored in the user-to-user field, switch table(s), call detail records, and on-line data systems. Additionally, the billing system may reference external and/or other databases during and/or after the call to rate, bill, calculate taxes, and report on the call because the original call data may be modified and/or carry extra data that references indirectly the geographic location and duration of the caller and the called party(s) for each part of the call. Preferably, the billing and reporting system(s) do not rely on the modified Dialed Number and/or modified ANI alone due to the change in value. However, the original ANI and/or Dialed Number plus the final geographic location of the termination (plus duration and other stored data) may be used for accurate billing and reporting.

The Dialed Number may be modified in accordance with the present invention to reflect the status of both the caller and the called party. Data input or collected from the caller, prior and/or current knowledge about the caller as revealed by the CSI and/or CSA, the network status, and/or information about the initially dialed location as well as possible subsequent locations (e.g., busy) are examples of the type of data that may be examined to determine whether and how the Dialed Number field may be changed. Based on the results of a data evaluation, the Dialed Number may be modified to change the routing of the telephone call, the destination of the telephone call, or the priority of the telephone call. Other changes to the dialed number may be made as well such as blocking the call or providing other special treatment such as "ring, no answer." Finally, the Dialed Number may be modified to include additional data such as the present invention reflects changes in the ANI field. Many other changes may be made to the Dialed Number value as well depending on the goals to be accomplished.

In a preferred embodiment of the present invention, formats of the data of the modified/replaced fields (ANI, Dialed Number, user-to-user messages sent as part of IAM, etc.) conform to the data screening and data format requirements of the Public Telephone Network and/or Private Telephone Network and the CCITT standards for international call routing. For example, area codes of ANI are currently greater than 200. A valid ANI is 614-847-6161 while 150-847-6161 is not valid because 150 is less than 201. Also, for a ten digit dialed number, the first three digits may not be 911 as the digits 911 can receive special treatment through the local telephone network. Consequently, substituted data values preferably conform to the format, type, range, etc. constraints for each field. The possible data values that meet the requirements and constraints number in the hundreds of millions (or more). A variety of combinations and permutations are available so that many unique numbers are available.

The CSA or CSI number may, if desired, be identified as such (in other words, in the case of a modified ANI field, to let the telephone system know the call format is no longer reflecting the ANI in the ANI field). This may be accomplished in a number of ways that would be apparent to one of ordinary skill in the art. One such way may be by tagging the CSA or CSI number with an agreed to standard identifier, such as a standard first two or three digits in every CSA or CSI could be 999 for example.

Figure 2:
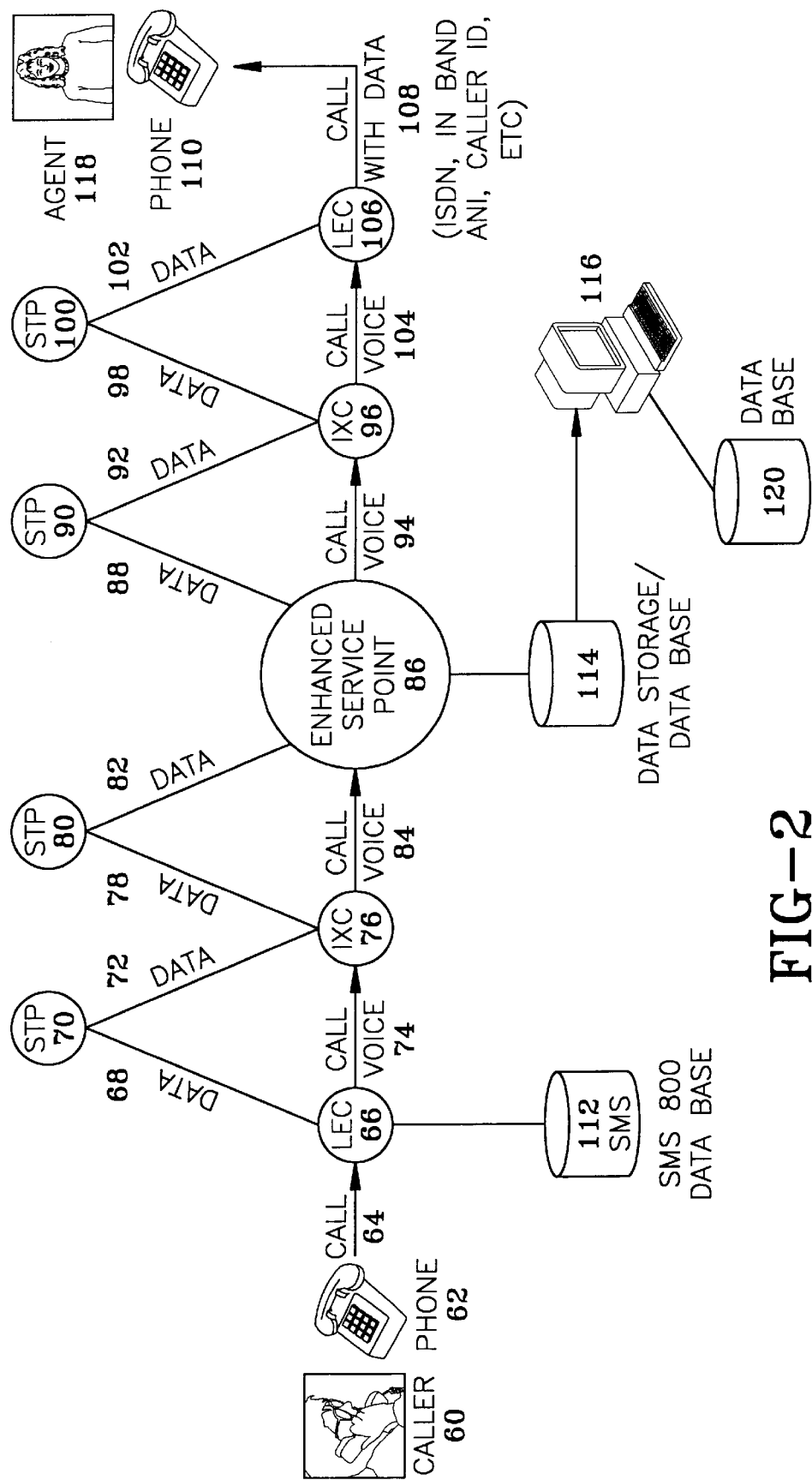
FIG. 2 shows a call's voice and data flow in a typical telephone call, in a preferred embodiment of the present invention.

FIG. 2 of the present invention represents a simplified example of a call flow going through the telephone network. Please refer to FIG. 6 for a more complete example of a call flow. FIG. 2 illustrates that the data portion of the call travels over a separate network as part of SS7, different from older technologies where the call data used to travel with the call. One of the features of SS7 is the fact that the data and control of the telephone call is on a totally separate data network, the SS7 network, traveling separately from the voice or analog portion of the call.

In FIG. 2 a caller 60 lifts the handset on a telephone 62 to initiate a phone call 64 into the telephone network. The LEC (Local Exchange Carrier) switch 66 realizes that the telephone 62 has gone off hook due to current flow, and provides a dial tone to the telephone 62 so that the caller 60 may initiate his telephone call 64 over the telephone network. The caller 60 proceeds to enter the dialed number on the telephone 62 and the data is passed as part of the call 64 to the LEC switch 66. After screening the caller entered call data (dialed number), plus assigning the calling number (ANI) to the line creating the call, the LEC switch 66 determines if the call is a local call which can be completed by the local LEC network, or if the call should be handed off to an IXC (Interexchange Carrier) for a long distance call or an intra-LATA call that is to be handled by an IXC. For this example it is assumed that an IXC is involved, and that the call will be transported out of the LATA, although it does not have to be, and that the call data will be passed to the IXC for further processing.

The call 64 that was created, and the call's associated information including the dialed number and the number the caller is calling from (ANI) plus other caller data is stored in the LEC switch 66. The LEC switch launches a data element 68 "IAM" (Initial Address Message that contains both the dialed number and the ANI) plus other call data to the IXC, who can be selected on a call-by-call basis. The IXC may be the 1+IXC for this caller, or it may be an 800 number, 900 number, 500 number or other type of general purpose number. For example, for an 800 number the LEC switch 66 accesses the SMS 800 data base 112 (this is a simplified diagram) to determine which carrier will be passed the call detail (IAM) for a gateway type call such as a 1-800 call. In this case, the carrier would be selected based on the SMS 800 data base 112 and the call data 68 would be sent from the LEC switch 66 to the STP 70 handling the carrier. At some time a voice path 74 for the voice portion of the call will be selected by the LEC switch 66 and will be presented to the carrier's switch 76 if the LEC switch 66 is to complete the call or provide voice path or additional information such as a ring, intercept, and the answering of the phone call itself, to be passed back over the listen (talk) paths to the Caller 60.

The carrier receives the call data 72 assigns the talk paths 74 and forwards the call data (IAM) on, as call data 78 to an STP 80. The call data (IAM) 82 may be forwarded to an intermediate carrier or enhanced service provider 86 (a place where the call can be further processed). The call path 84 is also selected by the IXC 76 to access the enhanced service point 86. If a call path is not assignable through the network, then the call cannot be completed and a data busy packet will be sent back through the data network to the LEC switch 66 to generate a busy signal to the caller 60. This may occur during any part of the call until answered by the enhanced service point 86. In this example, the enhanced service point 86 will issue an off hook answer SS7 message based on the caller information contained in the IAM, plus other data. Enhanced service point 86 has in its databases on site 114, plus access to remote data bases 120. The Enhanced Service Point 86 sends an "off hook" or SS7 answer message which will be sent backwards through data 82, through STP 80 and data 78, to the IXC switch 76 to tell the IXC to cut through the call voice path 84 to the enhanced service point 86. The IXC 76 will pass back through data 72 through STP 70 through data 68 to the LEC switch 66 that the call 64 will be answered by service point 86 and that the local phone company at switch 66 should complete the call voice path 74 to the IXC 76.

At this point in the answered call, the call path has been established using talk paths (voice/analog channels) 74 and 84 and the enhanced service point 86 is now prompting the caller 60 for the caller's account number, social security number, reason for calling, and/or other enhanced data. Once the enhanced service point 86 has determined as needed who is calling, and as needed why they are calling, the enhanced service point may then change or modify the dialed number as needed, and change or modify the ANI as needed, as well as put any additional data into an external database 114 as needed, and transfer that data to database 120 as needed, as well as updating the user-to-user field(s) of the IAM (Initial Address Message) to be sent across the data network 88 as needed.

The call is now ready to be tandemed, or passed on, through the telephone network. The new IAM (with the new and/or modified data) call data is now ready to be presented to the called party (or revised called party—agent 118) in data element 88 which is passed through the STP 90 to data element 92 to IXC 96. The IXC 96 will route the call based on the new dialed number (if changed) and will carry forward the changed ANI and/or IAM of the call to pass on to the LEC 106 and/or called party as the new called number will designate. The IXC 96 views this call as a tandem call, a call being passed on through the telephone network, and accepts the modified and/or new Dialed Number as well the modified and/or new ANI and/or modified IAM as if it were part of the original call record and has no knowledge (unless otherwise informed) that anything has been changed. The IXC 96 based on the new dialed number, routes the call to LEC 106 and sends the data 98 about the call to the LEC's STP 100 which can be forwarded on to the local LEC switch 106 through data 102. The call 108 is then presented to the destination location 110. Based on the invention and the modified IAM, ANI and/or modified called number, the agent 118 knows precisely who is calling, to the extent needed, based on the data now carried in the IAM and/or ANI field, to the agent 118 and accessed by the agent's work station 116. The agent 118 may have direct access to the data stored at database 114 and/or the data stored at location 120 or any other place in the data network. When the agent 118 answers the call, the call is completed from caller 60 through enhanced service point 86 through voice paths 94, 104, and 108.

The IAM (Initial Address Message) is a data packet that represents the call and has pre-designated fields that normally contain the original ANI and the original dialed number for the call.

The network that is receiving the IAM for the call, after the location where the ANI change and/or dialed number change has taken place, is viewing the IAM for the call as a tandemed call or a call being switched and passed along through the network. The network outside the invention has no need (unless required) to know that the ANI and/or dialed number values have been changed or modified since the new values conform to format standards for IAM messages.

The new values that are to replace the existing values for the ANI and/or the dialed number are placed in the output buffer for the corresponding IAM fields with the appropriate check digit calculations and field indicators and then the IAM record is presented to the outgoing network as a call to be tandemed (or passed along).

For example, referring to FIG. 2, the enhanced service point 86 received an inbound IAM from data 82 that represents an inbound call 84. The enhanced service point 86 saves the incoming IAM data 82 in the input buffer for the call 84 and answers the call by sending progress and SS7 answer messages back through data 82 through the network to the callers LEC switch 66. After the enhanced service point 86 has collected call data from the caller 60 as needed, the enhanced service point 86 takes the saved original incoming IAM data 82 message referenced for the call 84 and places it into a dial out buffer referenced for the new outbound call 94 to be created for the voice path of call 94 represented by the outbound IAM data 88 for the call to be sent as data 88. Before the outbound IAM is sent on as data 88, the corresponding ANI field is changed or modified as needed and/or the dialed number is changed or modified as needed, and data may be placed in the user-to-user element space for the outbound call 94 IAM as needed. Now that the IAM data 88 for the outbound call 94 has been modified as needed, the IAM data 88 for the call 94 is presented as a tandemed call to the IXC 96 using data 88, STP 90 and data 92.

Figure 3A:
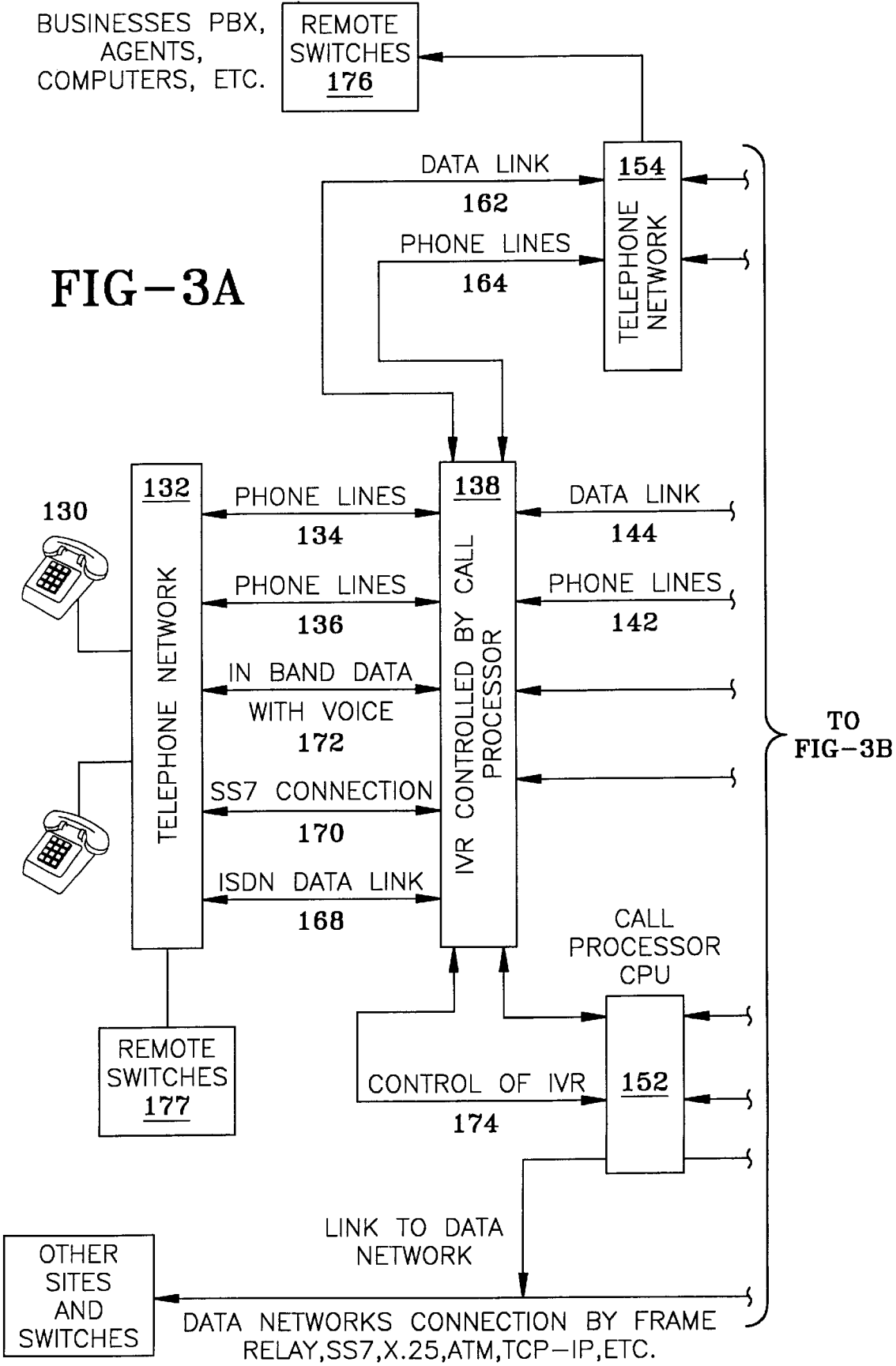
FIG. 3 shows a call processing flow of one embodiment of the present invention in which an interactive voice response unit is positioned before a telephone switch.
Figure 5A:
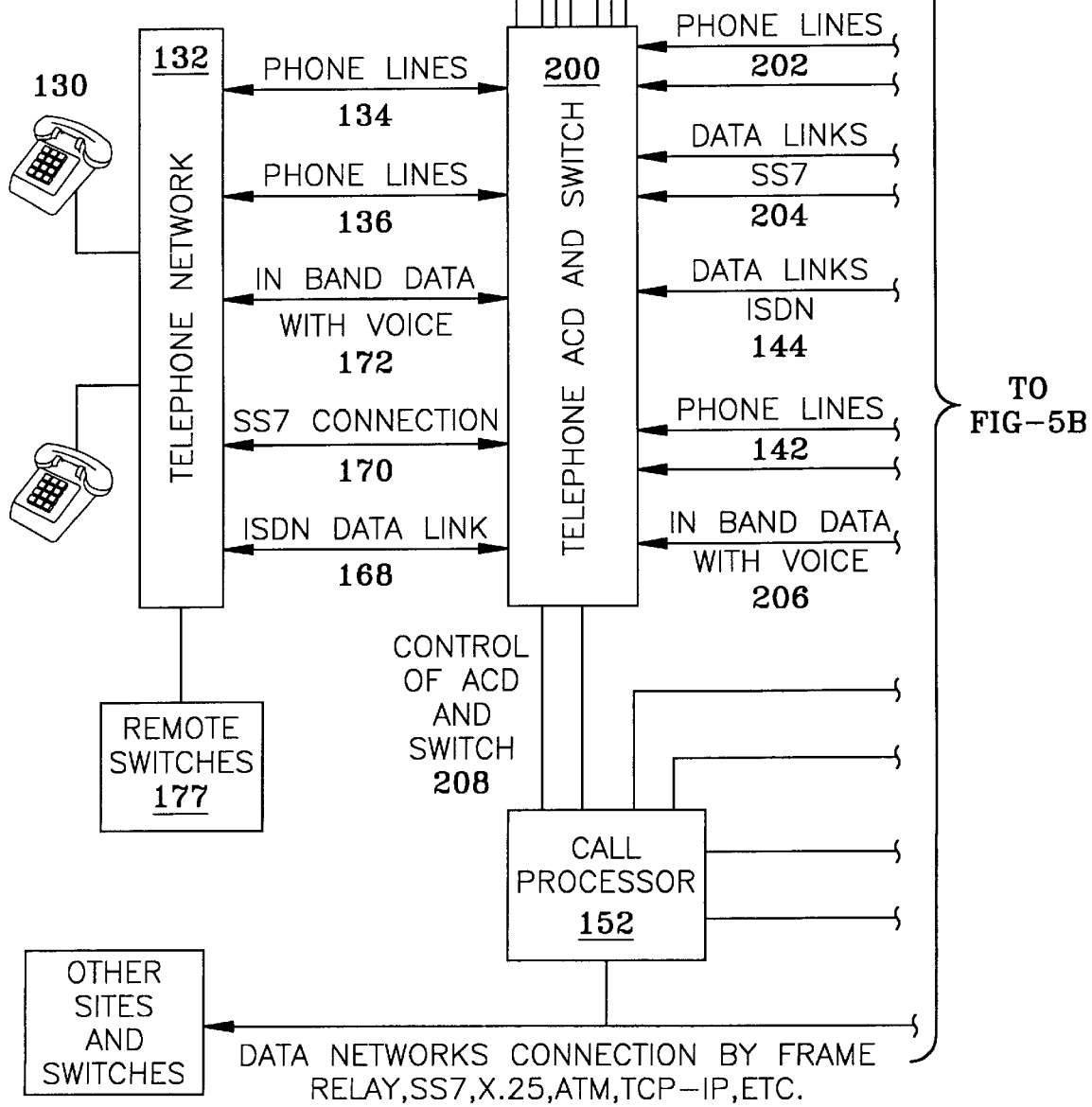
FIG. 5 shows a call processing flow of one embodiment of the present invention in which an interactive voice response unit is positioned behind the telephone switch.
Figure 5B:
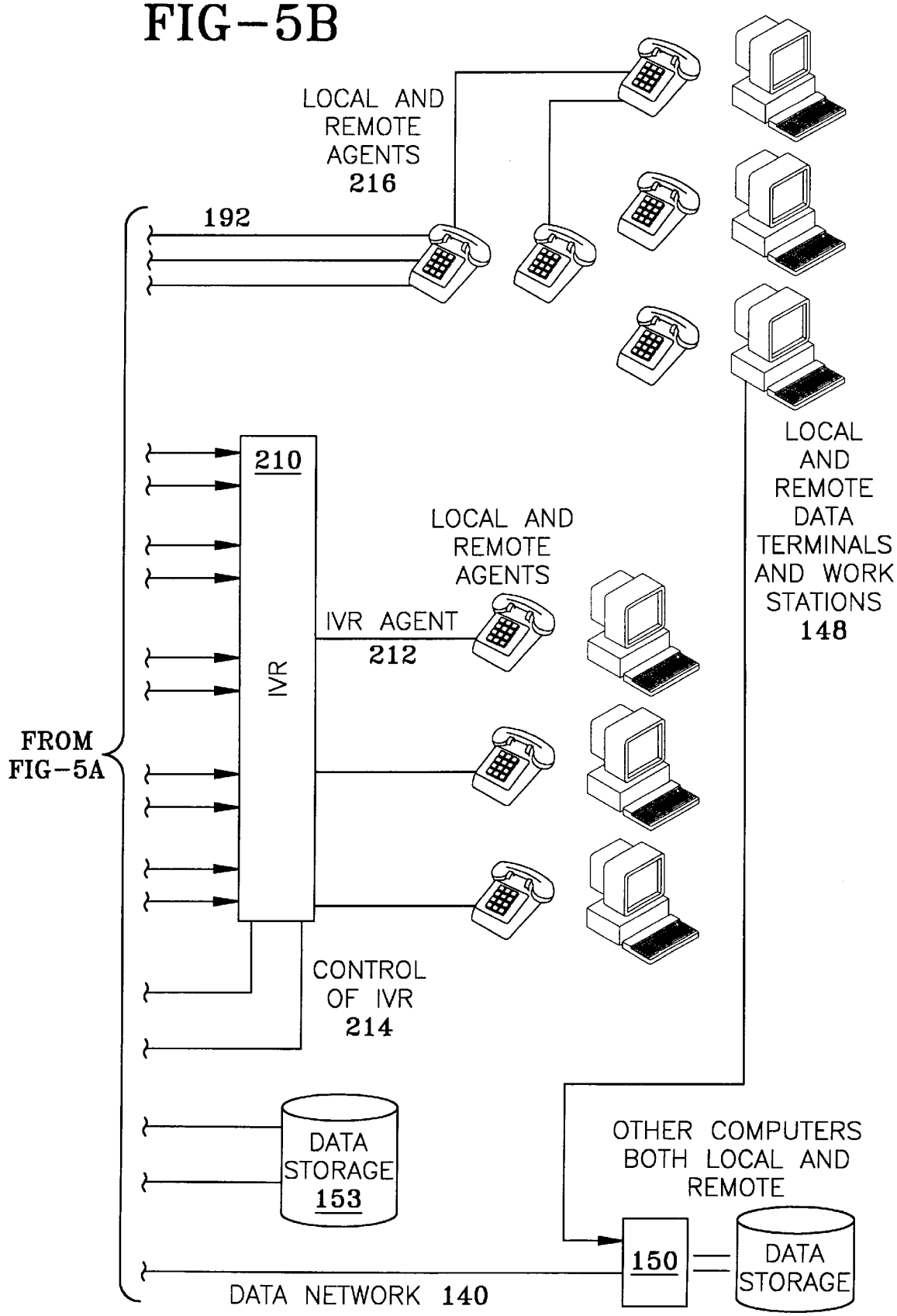

FIGS. 3, 4, and 5 refer to different call processing and/or information gathering that will be needed to query the caller to determine who is calling, and why they are calling so that the data can be placed into the telephone network. This new enhanced data can flow through the data network (SS7, ISDN) that describes the call and at the same time be accessible through the on-line database network.

In FIG. 3 the caller 130 places a telephone call, which is routed through the telephone network 132 to an enhanced service point somewhere in the telephone network. The enhanced service point may be located at the local LEC location or anywhere in the telephone network, and/or may be located at multiple locations in the telephone network. In FIG. 3 an IVR 138 (interactive voice response unit) is located before the telephone switch 166. The call processing system 152 has access to the telephone network 154 using links [158, 160, 162, 164] through IVR 138 and switch 166.

The data from the telephone network 132 is presented to the call processing controlled IVR system 138 through multiple possible data links. Link 170 would be an SS7 connection, link 168 may be an ISDN data link (D-Channel), link 172 may be a combination of in band voice and data over the same line phone lines, and phone lines 134 and 136 represent traditional telephone lines usually referred to as B-Channels, with associated data carried over links 168 and 170. The call processing system 152 controls the IVR system 138 through links 174 as well as the telephone switch 166 through links 156. The call processing system 152 receives data from the IVR system 138 as well as the telephone switch 166. The Dialed Number and ANI data, other network data, and/or database data is evaluated by the call processor 152 through the call processor's access to the IVR 138 by data links 174. In addition, if the telephone call is not on a phone line that is convenient to the call processing system 152, the call processor 152 through the IVR 138 using the ISDN data link 168 or the SS7 data link 170, can renegotiate the calls from phone line 134 or phone line 136, or to other phone lines, to negotiate "the incoming call" to place it on a line of its selection based on services that the call processor 152 would like to see appear or be offered to the caller 130. For example, using channel negotiation, the call may be moved from line 134 to line 136.

The call processor 152 preferably is equipped to greet the caller 130 using the IVR 138, and may proceed to inquire through touch tone, voice recognition, automated agent and other mechanisms to determine who exactly is calling and why they are calling. The call processing system 152 can access local databases 150 and remote databases through network 140 to validate, acquire and update data as needed. If sufficient information cannot be obtained from the caller through an automated interface, then the call processor 152 can instruct the IVR 138 to tell the caller 130 to please hold while the caller is being routed to a live agent. The call processor 152 can then instruct the IVR 138 to send the call through phone line 142 using data link 144 to the telephone switch 166 using control links 156 and 174 to route the telephone call to an agent located on phone lines 146 to collect additional data. Once the agents at location 146 collect additional data and input it into a database 150 through work stations 148 the information will then be accessible by the call processor 152 which will have access to this database through data link 140. The call processor 152 has multiple choices as to how to present the call out to the telephone network. Two of these choices follow:

(a) The call processor 152 can instruct the IVR 138 to drop the phone call link going to agent 146 over telephone line 142 while holding onto the caller 130. The call processor 152 instructs the IVR 138 to change the dialed number and/or the ANI and initiate a phone call over data link 162 out into the telephone network 154 using phone lines 164. Telephone network 154 may route the call to remote location 176, based on data in the call's IAM. At any point in time the remote locations 176 can again instruct the call to be transferred, more data to be collected, the call to be re-routed using networks at remote location 176 and additional call forwarding or call processing to occur as necessary. The IVR 138 can also instruct the switch 154 to drop the call that is at location 176 while holding onto the caller 130 and the IVR 138 can initiate a new call, a conference call or any other new call routing, by having the call processor 152 initiate a new call through the IVR 138 with new call data (dialed number and/or ANI) as a new call is presented over data link 162 and phone lines 164 to telephone network 154 without dropping the caller 130.

(b) The call processor 152 using data link 156 instructs the telephone switch 166 to drop the agent off of link 146 while holding the caller 130 at the switch 166 and to instruct the telephone switch 166 to initiate an out bound call into the phone network 154 using the data link 158 and the voice paths 160. As in paragraph "a" above, the call will then be routed over the public telephone network, and/or the private telephone network with the current call routing and destination using the same or a new dialed number and/or modified or new ANI which will carry information that will trigger receipt of the telephone call at a far end destination with special treatment. The additional call data can be retrieved from call processor 152 as well as the agent database 150 through the data network 140 supporting the remote sites 176, 177, remote agents and remote centers with additional call data. When the remote sites and remote agents are finished with the call, the call can again be forwarded on, taken back while holding onto the caller 130 for re-routing again by switch 166 or terminated, depending on the needs of the caller.

From a comparison of FIG. 4 with FIG. 3 and FIG. 5, it may be recognized that when the call processing (ACD, IVR) functions are all integrated into a centralized switch, under the call processor's control, the telephone network interfacing may become simpler and call control and call processing may also become simpler. As shown in FIG. 4, the interactive IVR systems, the switch, and the call processor may still be separate functions, which are now integrated and appear as one continuous system to the call processor 190 such that the switching and/or voice processing and data collection are now integrated as one entity call processor 190.

Referring to FIG. 4, the caller 130 places a telephone call, which is routed through the telephone network 132, to an enhanced service point somewhere in the telephone network. The enhanced service point can be located at the local LEC location, or anywhere in the telephone network, or at multiple locations in the telephone network. For FIG. 4, the call processing system 190 has direct access to the telephone network 132 and telephone network 154 as well as to the local and remote agents 192, as well as indirect access to the agent work stations 148 and data base 150 through the data network access 140.

The data from the telephone network 132 is presented to the call processing system 190 through multiple possible data links. Link 170 could be an SS7 connection, link 168 could be an ISDN data link(s) as D-Channels, while link 172 could be a combination of in band data and voice using the same phone lines. Phone lines 134 and 136 represent traditional telephone lines usually referred to as B-Channels for those telephone calls who's associated data is carried over associated links 168 and 170. The call processing system 190 controls the IVR functions, which along with the telephone switch, is also integrated into the call processing system 190. The dialed number and ANI data, plus other network data presented over links 168, 170, 172 and/or database data 150 is evaluated by the call processing system 190, and in addition, if the telephone call is not on a phone line convenient for the call processing system, the call processing system through its data link connections 168 and/or 170, can renegotiate the calls from phone line 134 or phone line 136 to other phone lines to place the call on a line that is selected based on services that the call processor 190 determines from information received from the caller should appear or be offered to the caller. For example, using channel negotiation, the caller 130 is moved from line 134 to line 136. The call processor 190 greets the caller using the integrated IVR as part of the call processor and proceeds to inquire through touch tone, voice recognition, automated agents and/or other known mechanisms to determine who exactly is calling and why they are calling, as necessary. If sufficient information cannot be obtained from the caller through an automated interface, than the call processor 190 can route the calls through the integrated ACD which is also part of the call processor 190. While placing the caller 130 on hold, the caller may be routed to a live agent that can be local and/or remote through live agent lines 192.

Once the agents at location 192 collect additional data and input it into the database 150 through work station connections 148, the information will then be accessible by the call processor 190 which will have access to this data through the database connection 140. The call processor 190 has multiple choices as to how to present the call to the telephone network 154 using data links 162 and phone lines 164. The call processor can now change and/or modify the dialed number as needed and/or change and/or modify the ANI as needed, as well as place additional data in the call processor's database as well as other database(s) 150 and other databases using data network connection 140. The call processor 190 can also place any additional information necessary in the user-to-user IAM (Initial Address Message) of the telephone call to initiate out into the telephone network 154.

The call is now ready to be tandemed, or passed on, through the telephone network 154, (note telephone network 154 could just as well be telephone network 132) and the new IAM (Initial Address Message with the new and or modified data) call data is now presented to the telephone network 154 through data link 162 with the audio portion using phone lines 164 (note the call could just as well been sent out to telephone network 132 to access remote site 177 instead of telephone network 154). The telephone network 154 (and/or 132) can view this call data as a tandem call, or a call being passed on through the telephone network, and accepts the modified and/or new dialed number as well as the modified and/or new ANI as if they were part of the original call record and the telephone network 154 (and/or 132) has no knowledge (unless otherwise necessary) that anything has been changed. Any one or more remote locations 176, 179, 177 will receive the call and answer the call according to the modified information that is being presented to the remote location. Upon the completion of the processing of the call, the remote location can:

(a) terminate the call;
 (b) transfer the call to another location and provide the same dialed number and/or ANI modification and/or any other data modification as needed, update database information as well as database updates to the call processor's data and other remote databases 150 using data network 140 as needed; or
 (c) transfer back to the call processor 190 using the data network 140, that the remote location (176, 177, 179, etc.) would like the call processor to take the call back while not dropping the caller 130 and process the call further to other remote locations and/or other locations and functions available to the caller 130 through the public telephone network and the private telephone network.

The call processor 190 may drop the telephone call link going out over line 164 using telephone network 154 while still maintaining the connection to the caller 130 through the telephone network 132 through the call processor 190 without impacting or affecting the caller 130. This allows the call processor to (a) collect more data;
 (b) use existing and currently collected data stored at locations 190, 150, 176, 177, 179 and elsewhere through data link 140; and/or
 (c) modify the dialed number and/or ANI of the call again as needed, while launching successive telephone calls into telephone network 154 using phone lines 164 and data link 162 and/or into telephone network 132 using phone lines 134, 136 with data links 168, 170. This process can be repeated until all of the reasons for the call have been satisfied. All of the data will then be available through single and multiple databases 150 and others accessed through data network 140 and/or databases managed by the call processor 190, for final billing and/or reporting as needed.

Figure 9:
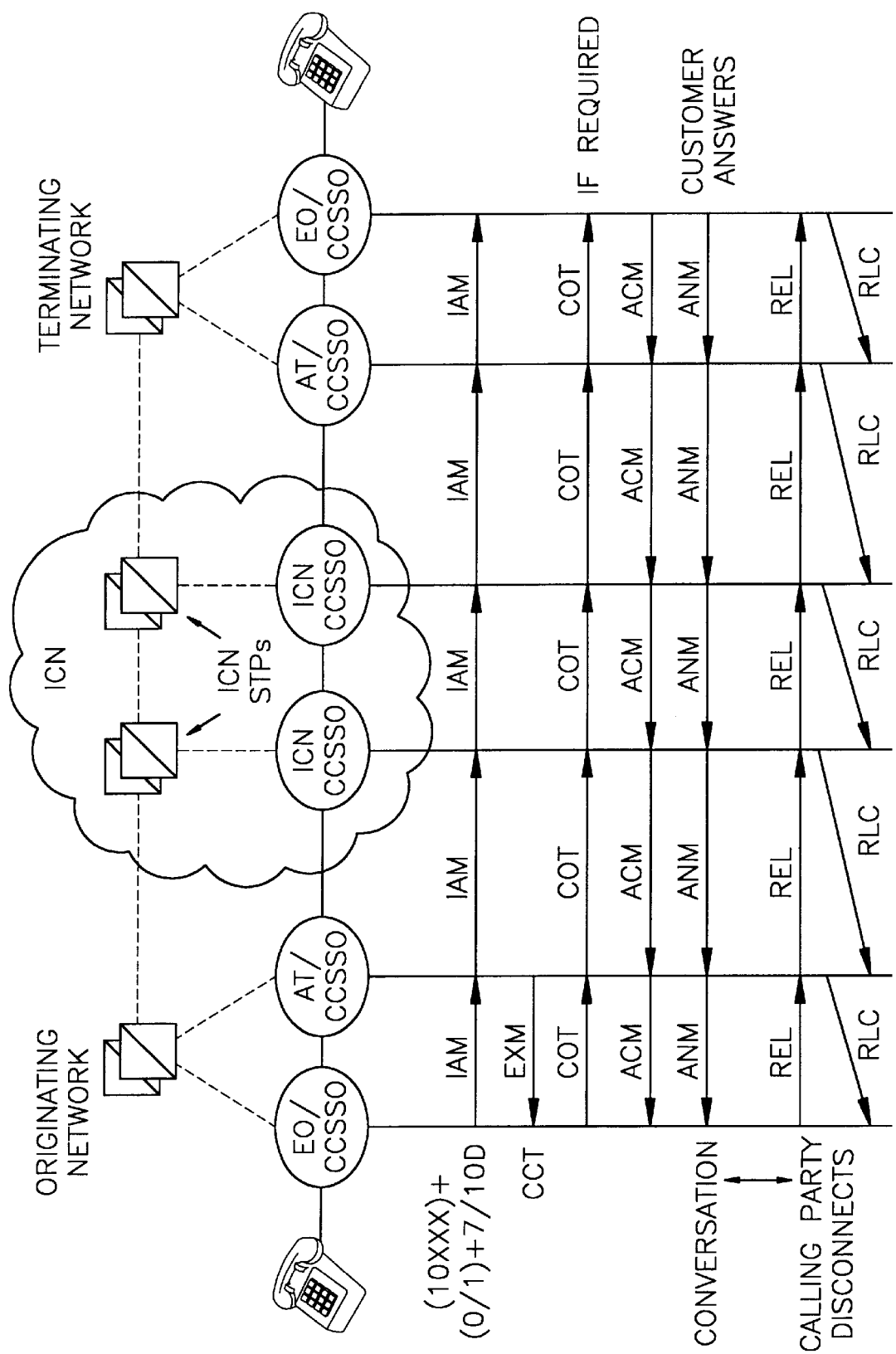
FIG. 9 shows a diagram of a simple telephone call originating at one LEC and terminating at a second LEC, including an SS7 message, in which the present invention may be incorporated.

FIG. 9 was taken from the CCSNIS Supporting Network Interconnection, MTP and ISDNUP Bellcore manual GR-905 dated March, 1995 (as FIG. 4.1 in the manual, and the entire manual is hereby incorporated by reference herein). FIG. 9 shows a simple telephone call originating at one LEC end office and terminating at a second LEC end office, and assumes the calling party will be the one to disconnect the call. FIG. 9 also shows an SS7 message is sent from the originating network end office to the originating LEC's STP. That data is also sent to the originating LEC office access tandem through the STP. Through the originating LEC STP, that information is forwarded to the carriers or the carrier's first STP node, which then signals the carrier's first SSP switch. The SS7 message is also transferred to the carrier's second STP node and also sent to the carrier's second SSP switch. The SS7 message is also forwarded from the carrier's second STP node to the terminating LEC's STP, which also forwards the SS7 message to the access tandem of the terminating LEC. The SS7 message is also sent to the end office telephone switch of the customer who is receiving the phone call. At least nine SS7 messages were generated and at least five Initial Address Messages (IAM) to complete a simple telephone call from one end office in one LATA to a different end office, which could be in the same LATA or in a different LATA, through an interexchange carrier. For this simple example shown in FIG. 9, a minimum of 31 (thirty-one) network SS7 messages are shown in the form of five IAM messages, one EXM message, five COT messages, five ACM messages, five ANM messages, five REL messages, and five RLC messages.

It is possible to have significantly more messages than that. There is no retry, error recovery, forward signaling, database access to SCP's routing look-ups, channel negotiations, or other additional enhanced SS7 features being utilized for this simple phone call. In FIG. 9, as can be readily seen, there are five IAM messages; at any one of those locations the telephone call could have been answered and the present invention could have been implemented; the dialed number and/or the ANI could have been modified in accordance with the present invention; the subsequent IAM messages would contain the modified data and the call would flow through the telephone network, transparent to the telephone network that the IAM message had been updated or modified. This is a simplified example of a telephone call. In a complex telephone call you could easily have over 100 SS7 messages.

In FIG. 5, the call processor 152 which is controlling the telephone switch 200 through data lines 208 is connected to the IVR 210 which is now located after the telephone switch 200. In addition, FIG. 5 shows remote and local agents 212 who are hanging directly off of the IVR 210, in addition to the traditional agents 216 who are hanging off of the ACD switch 200 through lines 192. FIG. 5 also shows voice with in band data 206 being transferred between telephone switch and ACD 200 and the IVR 210 (which is in addition to the in band data with voice between the telephone network 132 over link 172 to the telephone switch and ACD 200, which is common to both FIGS. 3 and 4 as well). All the functionalities provided through FIGS. 3 and 4 are also accomplished in the embodiment shown in FIG. 5 with the call processing 152 through the data links 208 managing the switch 200 as well as the IVR 210 being located behind the switch and being managed by the call processor 152 through data links 214.

The caller 130 places a telephone call which is routed through the telephone network 132 to one or more enhanced service points at predetermined location(s) in the telephone network. The enhanced service points can be located at the local LEC location or anywhere in the telephone network, or at multiple locations in the telephone network. For FIG. 5, the IVR 210 is located after the switch 200, and both the switch 200 through data lines 208 and the IVR 210 through data lines 214 are preferably being controlled by the same call processor 152 directly and/or indirectly.

The data from the telephone network 132 is presented to the call processing system 152 through use of the switch 200 passing on data and control to the call processor through data link 208. For the switch, link 170 may be an SS7 connection, link 168 may be an ISDN data link with D-Channels, and link 172 may be a combination of in band data and voice over the same phone lines. Phone lines 134 and 136 represent traditional telephone lines usually referred to as B-Channels for those telephone calls whose associated data is carried over links 168 and 170. The data is captured by the telephone switch 200 and passed on to the call processing system 152 through the data link 208. The dialed number and ANI plus other network data and/or database(s) through access by data network 140 plus database(s) 150 are evaluated by the call processing system 152. If the telephone call is not on a phone line convenient for the call processing system 152, the call processing system 152, through the connection 208 to the telephone switch 200, can cause the telephone switch to renegotiate the proper location of the call on the proper phone lines, giving the best service to the caller.

The call processor 152 then initiates a telephone call using switch control links 208 between the switch 200 and the IVR 210 using data links 204, 144 or 206 with associated phone lines 202, 142 or 206 such that the call is presented to the IVR 210 for greeting. Now that the caller 130 has been forwarded all the way through to the IVR 210, the call processor 152 may instruct the IVR 210 to greet the caller using the IVR as part of the call processor's functions and can then proceed to inquire through touch tone, voice recognition, automated agents and/or other mechanisms to determine who exactly is calling, and why they are calling as necessary.

If sufficient information cannot be obtained from the caller through an automated interface then the call processor can route the caller through to the integrated IVR agents 212, which can be both remote and/or local, and/or the IVR under the control of the call processor 152 can link back through to the switch 200 using data lines 204, 144 and/or 206 and bridge the voice path back to the switch using phone lines 202, 142, and/or 206 to reach integrated agents 216 hanging off of switch 200 using lines 192. In either case, the IVR 210, using its directly attached IVR agents 212 or its indirectly attached IVR agents 216 accessed through the switch 200, gets the caller 130 to a live agent.

Once the agents at location 212 and/or 216 collect additional data and input it into the database 150 through work station connections 148, the information will then be accessible by the call processor 152 which will have access to this data through the database connection 140. The call processor 152 has multiple choices as to how to present the call to the telephone network 154 using data links 162 and phone lines 164 and/or to the telephone network 132 using data links 168, 170 and voice links 134, 136. The call processor 152 can now change and/or modify the dialed number as needed and/or change and/or modify the ANI as needed as well as place additional data in the call processor's database 153 as well as data base 150. The call processor 152 may also place any additional information necessary in the user-to-user IAM (Initial Address Message) of the telephone call before initiating the call into the telephone network 154 (and/or 132).

The call is now ready to be tandem, or passed on, through the telephone network 154, and the new IAM (Initial Address Message with the updated and or modified data) call data is now presented to the telephone network through data link 162 with the audio portion using phone lines 164. The telephone network views this call data as a tandem call, or a call being passed on through the telephone network, and accepts the modified and/or new dialed number as well as the modified and/or new ANI as if they were part of the original call record. The telephone network 154 does not have to have knowledge that anything has been changed but such knowledge could be provided to the telephone network, if requested or if otherwise needed. The remote location 176 (and/or 177) will receive the call and answer the call according to the modified information that is being presented to the remote location. Once the call has been answered (or before if necessary) at the remote location 176, the call processor 152 will need to bridge the caller 130 through the switch 200 dropping the IVR 210 out of the call without dropping the caller 130. The caller is now connected from network 132 using lines 134, 136 or 172 to the switch 200 to network 154 using lines 164 to reach location 176. Upon the completion of the processing of the call at location 176, the remote location 176 can:

(a) terminate the call;
(b) transfer the call to another location and provide the same dialed number and/or ANI modification and/or any other data modification as needed, update database information at location 176 as well as database updates to the call processor's data 153 and other databases 150 and other databases as needed using data network 140; or
(c) transfer back to the call processor 152 control using the data network 140, that the remote location 176 would like the call processor 152 to take the call back while not dropping the caller 130 and process the call further to other remote locations such as 177 using network 132 and/or other functions available to the caller through the public telephone network and the private telephone network.

The call processor 152 can drop the telephone call link going out over line 164 using telephone network 154 while still maintaining the connection to the caller 130 through the telephone switch 200 and the network 132, without impacting the caller 130. This allows the call processor 152 to reconnect the caller 130 to the IVR 210 from the switch 200 over phone lines 202, 142, or 206 to again query the caller to:

(a) collect more data;

(b) use existing and currently collected data stored at locations 150, 153, 176 and elsewhere through data link 140; or (c) modify the dialed number and/or ANI of the call again as needed.

In launching successive telephone calls into telephone network 154 and/or 132 and bridging the call through switch 200 the process of data collection and modification of standard call fields can be repeated until all of the reasons for the call have been satisfied. All of the call data will then be available through single and multiple databases on data network 140 and/or databases 153 managed by the call processor 152 for final billing and/or reporting as needed.

Many of the components described in FIGS. 2–6 are commercially available. The telephone network switches 132, 154 may be, for example, an AT&T 4E or a Northern Telecom DMS 250. IVR's are available from Periphonics Corporation, while AT&T also makes an IVR known as Conversant. Harris and Summa4 make telephone switches with ACD 200. Several remote switches such as the AT&T G3 are available. Several call processors 152 are available, such as Sun Microsystems Sparc 20, DEC's Alpha Computer and the Intel Pentium, to name just a few examples of call processors. Several database products 150, 153 are available, for example, Oracle and Sybase. The previously mentioned products and companies are generally widely known and available.

Figure 6A:
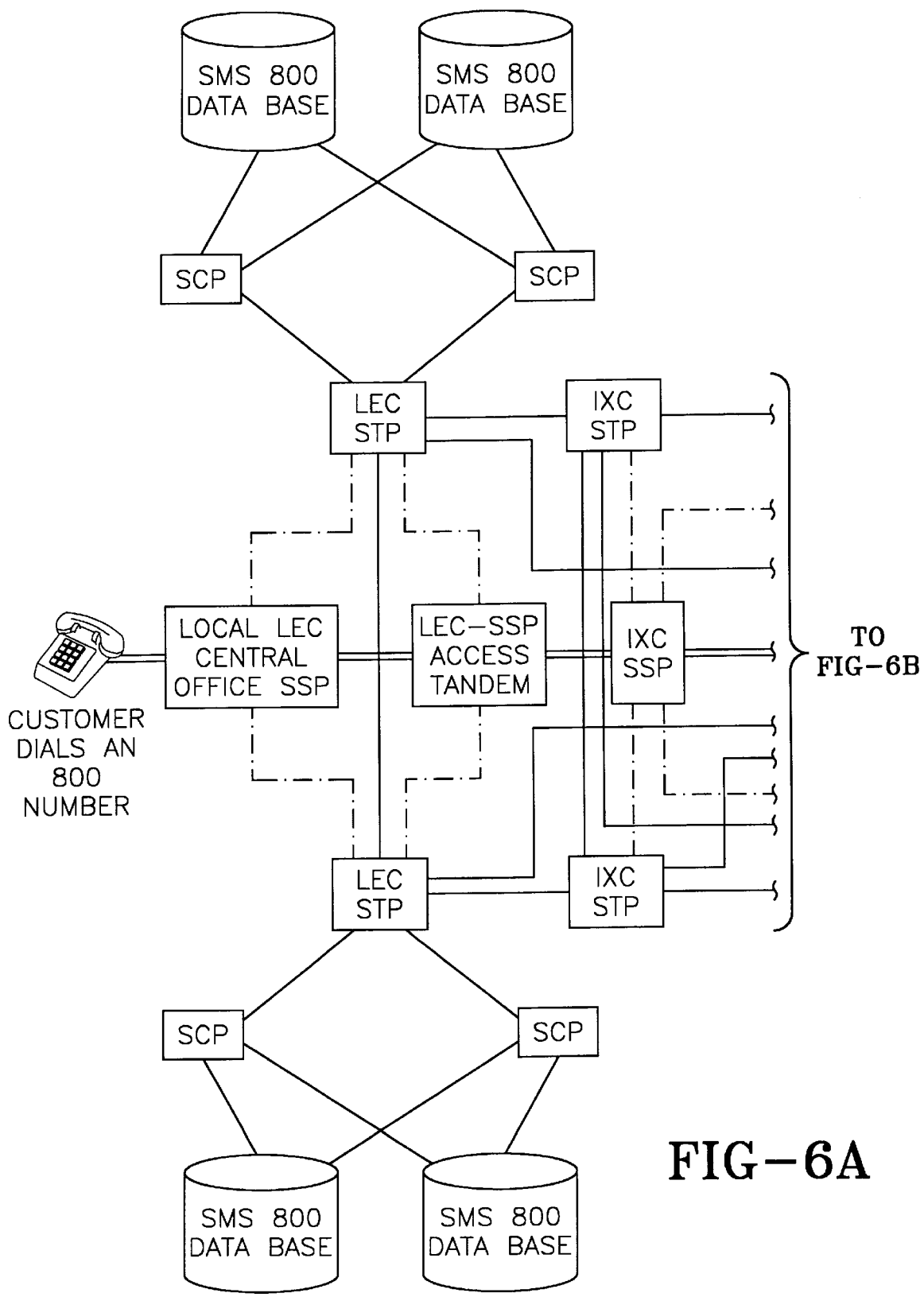
FIG. 6 shows another embodiment of the present invention.
Figure 6B:
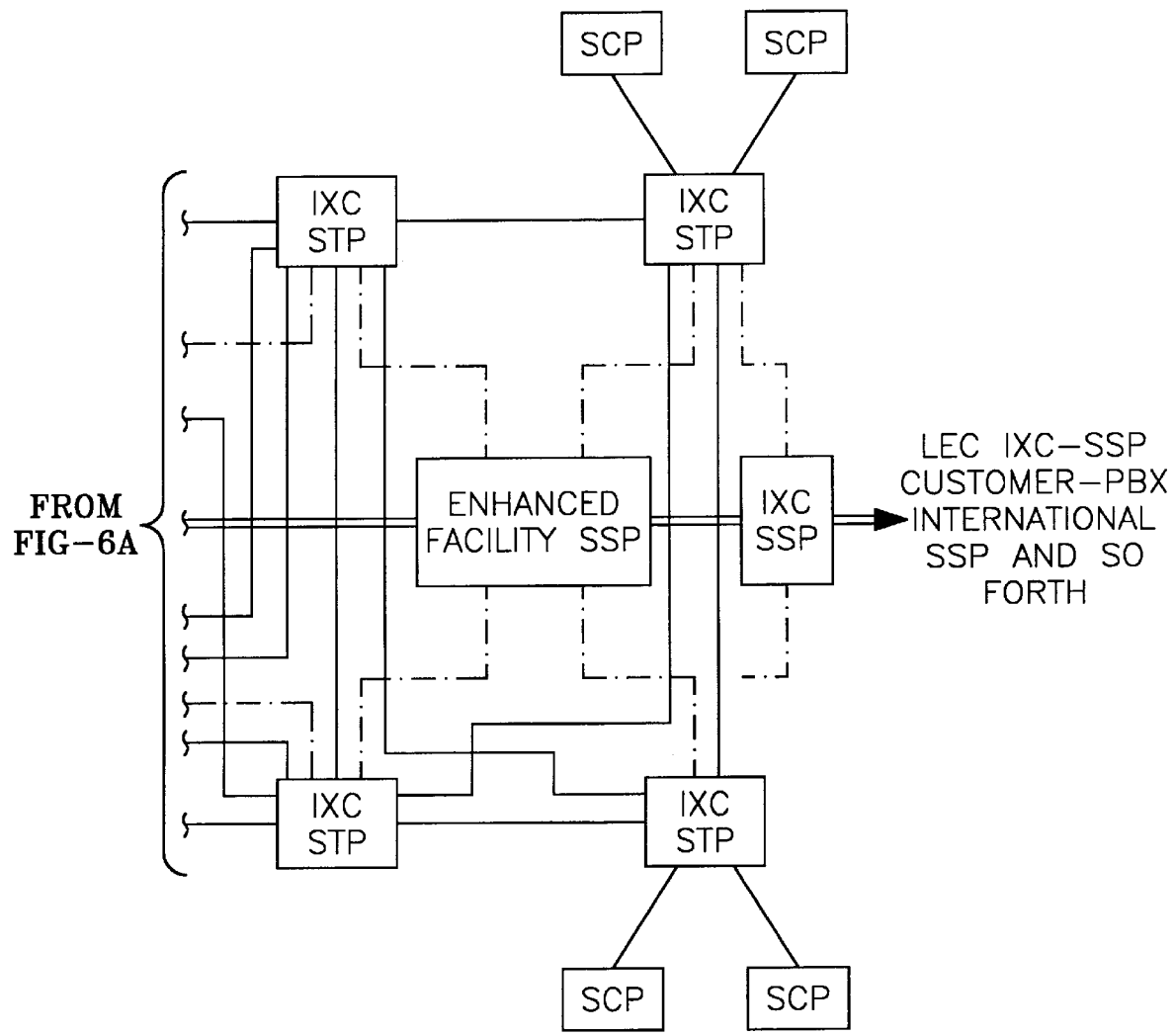
Figure 7B:
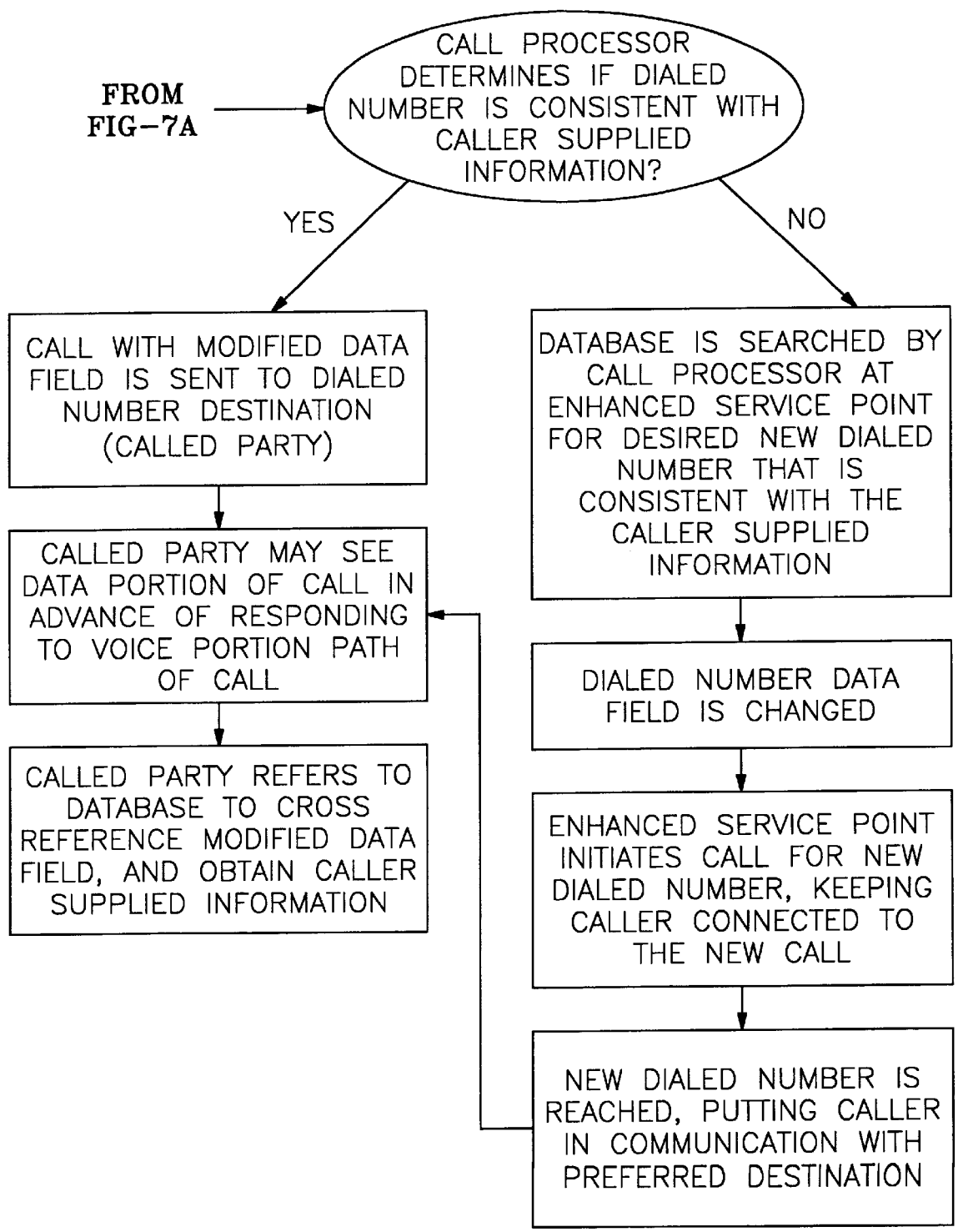

FIGS. 6, 8 and 9, show various examples of call processing environments, in which the present invention may be incorporated. The present invention has applicability in practically any call processing environment, and at practically any point in the call processing environment, as illustrated by these figures. FIG. 7 is a flow diagram of a typical process for implementing the present invention.

Using the method of the present invention, the ANI field of the call—which is an integral part of the call data—may truly represent the caller while the Dialed Number may be modified to reflect the status of both the caller and the called party. The benefits and advantages of the present invention may be illustrated with examples.

EXAMPLE 1

A caller calls an 800 number for an airline company. An IVR in the network prompts the caller for his frequent flyer number. The frequent flyer number is provided by the caller to the IVR (touch toned in, spoken, etc.). The frequent flyer number is used as input to the airline's computer, which has been programmed in accordance with the present invention, to determine:

(a) Validity of frequent flyer number (b) Additional data caller required to validate the caller (Social Security Number, mother's maiden name, etc.)

(c) Frequent flyer status and priority (Gold, Silver, Platinum, miles flown, etc.)

(d) Whether caller is scheduled for any flights that day (e) Geographic location of caller based on ANI (e.g., to determine caller is still at the airport ½ hour after scheduled flight has left)

(f) Additional data such as caller has lost luggage on last two times the caller has flown with the airline.

Using the information acquired from the airline's computer, data fields of the telephone call may be modified in accordance with the present invention to expedite processing of the call. For example, once the caller has validated his identity by giving the last 4 digits of the Social Security Number to the IVR (step b above), then:

(a) the Dialed Number field of the call may be changed to a higher priority Dialed Number so that the call is serviced immediately, (b) the ANI field of the call may be replaced with a "CSA" so agent handling the call may get a screen POP (display) such that all the data the agent needs to process the call is available even before the phone rings (as based on the "CSA" stored data and other external data available to the agent).

Even though the ANI and Dialed Number values are changed, the call can flow through the present Public and Private Telephone Networks, PBX's, call processors and ACD's because the changed data meets supported format and value ranges. Only the agent's computer needs to know to query a database using "CSA" to obtain the additional data. In the above example, based on the caller entered data that identified and confirmed the caller, the ANI field takes on the caller's real identity by assuming a value that serves as a reference to additional data and the Dialed Number field assumes a value to reflect a change in routing and priority.

EXAMPLE 2

A caller at a hotel wishes to call his girlfriend and get past her "Caller ID" box. The caller dials a gateway number (e.g., 1-800, 1-500, 1-614-847-6161, etc.) and identifies himself to the gateway by entering, for example, his home phone number and his LEC phone card PIN number. The gateway allows the caller to dial any public telephone number (or private number, if so provided) and the caller's home phone number is substituted into the ANI field of the gateway's out-bound call. The call may be billed through the LEC phone bill or through any other form of billing (e.g., credit card, private arrangement, etc.) The call then clears his girlfriend's Caller ID box (because it shows his home phone number) and rings (unless she has recently blocked his home ANI) her telephone. The call looks as though it came from the caller's home because the gateway substituted the caller's home ANI for the call.

In summary, the present invention facilitates the handling of telephone calls by placing caller specific information in the existing data elements of the telephone call. The caller specific information—which may include detailed data external to the actual telephone call data—allows the person handling the call to address the specific needs of the caller. In a preferred embodiment, the caller specific information is communicated to the called party before the call is answered so that the called party is better prepared to address the caller's needs. The present invention places the control, routing, CSI, CSA, and other data as needed in standard data fields such as the Dialed Number field and/or ANI field and/or "user-to-user" data fields in the standard IAM (Initial Address Message) of the call as well as in external on-line data storage for current and future access. Furthermore, the present invention may go backward into the network and modify and/or replace prior stored data so that prior switches that handled the call prior to the current location will have new or modified data as well as change the current call data so that the modified data travels with the call as the call is presented to new call switches and data transfer elements such as STP's so that the call is routed, answered, re-routed, and manipulated through the telephone network, public and private and customer network, IXC, multiple IXC's, CAP, other forms of transport, LEC, and/or premise equipment, including taking back and re-routing the call multiple times until the call and associated data is complete.

The ability to communicate specific information about the caller and the purpose of the call is unique to the present invention. The benefits of communicating specific caller information in accordance with the present invention are numerous. The information may, among other attributes, allow the called party to:

- more accurately determine the true identity of the caller to the extent needed or available; and/or
- determine the specific reason, service, action, or information needed by the caller to the extent needed or available; and/or
- collect a more relevant statistical sample of callers, since more knowledge is learned about the caller over and above the original dialed number and original ANI of the caller; and/or
- collect other caller input, priority, data, information that the caller may provide through the use of live and automated agents and IVR technology to the extent needed or available.

The present invention has been described in accordance with preferred embodiments. As may be apparent, other data fields of the telephone call may be modified or replaced in accordance with the techniques of the present invention so that additional information regarding the call is available to the called party. Various changes in form and details may be made without departing from the scope and spirit of the present invention.

What is claimed is:

1. A system for handling a telephone call, said system comprising:
   - an ANI field in a call element format of said telephone call;
   - a call data character stream which is in compliance with said call element format and which is adapted to reside in said ANI data field, said call data character stream adapted to reference call specific information;
   - a second standard data field in said call element format of said telephone call wherein said call specific information is stored;
   - whereby contents of said standard data field are modified by said call data character stream, and wherein said call data character stream is unique from the call's original ANI data and from the call's original dialed number, and whereby said call specific information includes information beyond that which is available from the original ANI and from the originally dialed number and wherein said ANI field of the call is increasingly updated to new data in one call, a plurality of times.

2. The system of claim 1 wherein the standard data field is a data field for a dialed number.

3. The system of claim 1 wherein the call data character stream replaces the contents of the standard data field.

4. The system of claim 1 wherein the call data character stream references information stored in a database.

5. The system of claim 1 wherein the call data character stream is used to process the voice path of the telephone call.

6. The system of claim 1 wherein the call specific information is selected from the group consisting of caller account number, caller social security number, and unique caller identifier.

7. A method for handling a telephone call, said method comprising the steps of:
   - modifying an ANI field in a call element format of said telephone call with a call data character data stream that is in compliance with said call element form and that is adapted to reference call specific information;
   - modifying by said call data character stream the contents of a second standard data field in said call element format of said telephone call wherein said call specific information is stored, wherein said call data character stream is unique from said telephone call's original ANI data and from the telephone call's original dialed number, and whereby said call specific information includes information beyond that which is available from the original ANI and from the originally dialed number; and
   - updating a plurality of times said ANI field of the telephone call to new data in one telephone call.

8. The method of claim 7 wherein the standard data field is a data field for a dialed number.

9. The method of claim 7 wherein the call data character stream replaces the contents of the standard data field.

10. The method of claim 7 wherein the call data character stream references information stored in a database.

11. The method of claim 7 wherein the call data character stream is used to process the voice path of the telephone call.

12. The method of claim 7 wherein the call specific information is selected from the group consisting of caller account number, caller social security number, and unique caller identifier.

* * * * *